(12) United States Patent
Tanabe et al.

(10) Patent No.: US 9,846,414 B2
(45) Date of Patent: Dec. 19, 2017

(54) SERVOMOTOR CONTROL DEVICE AND PRODUCTION SYSTEM EQUIPPED WITH THE CONTROL DEVICE

(71) Applicant: FANUC Corporation, Yamanashi (JP)

(72) Inventors: Yoshikiyo Tanabe, Yamanashi (JP); Hisashi Momotani, Yamanashi (JP); Yoshiki Hashimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 33 days.

(21) Appl. No.: 14/608,713

(22) Filed: Jan. 29, 2015

(65) Prior Publication Data

US 2015/0212496 A1    Jul. 30, 2015

(30) Foreign Application Priority Data

Jan. 30, 2014  (JP) ................. 2014-015859

(51) Int. Cl.
*F16P 3/12* (2006.01)
*G05B 9/02* (2006.01)
*G05B 19/048* (2006.01)
*G05B 19/406* (2006.01)
*F16P 3/14* (2006.01)
*H02P 29/024* (2016.01)

(52) U.S. Cl.
CPC ............... *G05B 9/02* (2013.01); *F16P 3/14* (2013.01); *G05B 19/048* (2013.01); *G05B 19/406* (2013.01); *H02P 29/0241* (2016.02)

(58) Field of Classification Search
CPC ....... F16P 3/14; G05B 19/406; G05B 19/048; G05B 9/02; H02P 29/024

USPC .......................................................... 307/328
See application file for complete search history.

(56) References Cited

U.S. PATENT DOCUMENTS 5,619,111 A * 4/1997 Katagiri ................. G05B 11/32
                                                               318/105
5,742,143 A * 4/1998 Katagiri ............... G05B 19/234
                                                               318/625

(Continued)

FOREIGN PATENT DOCUMENTS

CN        101204811 A    6/2008
CN        101376249 A    3/2009

(Continued)

*Primary Examiner* — Thienvu Tran
*Assistant Examiner* — Brian K Baxter
(74) *Attorney, Agent, or Firm* — Hauptman Ham, LLP

(57) ABSTRACT

A servomotor control device includes a servomotor control circuit for controlling an inverter such that an alternating current is supplied to a servomotor when receiving a safety signal, and for controlling the inverter such that the alternating current is not supplied to the servomotor when not receiving the safety signal, and a servomotor monitoring circuit for stopping the servomotor by stopping transmission of the safety signal to the servomotor control circuit when determining to stop the servomotor, and for stopping the servomotor by disconnecting supply of a direct current to the inverter with a power source disconnect circuit and stopping the transmission of the safety signal to the servomotor control circuit when determining that at least one of the power source disconnect circuit, the safety signal, and the servomotor control circuit is not normal.

9 Claims, 13 Drawing Sheets

(56) References Cited

U.S. PATENT DOCUMENTS

| | | | |
|---|---|---|---|
| 2005/0077853 A1* | 4/2005 | Nagakura | H02M 7/48 318/432 |
| 2006/0066283 A1* | 3/2006 | Ota | H02M 5/4585 318/803 |
| 2007/0046238 A1* | 3/2007 | Xu | G05B 19/4163 318/571 |
| 2007/0229015 A1 | 10/2007 | Yoshida et al. | |
| 2012/0001586 A1* | 1/2012 | Maruyama | H02M 1/12 318/798 |
| 2013/0053866 A1* | 2/2013 | Leung | B25J 9/1689 606/130 |
| 2013/0093242 A1* | 4/2013 | Mok | H02J 9/005 307/23 |
| 2013/0113411 A1* | 5/2013 | Suzuki | H02P 3/22 318/681 |
| 2014/0018958 A1* | 1/2014 | Ueno | B25J 9/1674 700/255 |
| 2014/0067121 A1 | 3/2014 | Brooks et al. | |
| 2016/0006237 A1* | 1/2016 | Helmerth | G05B 9/02 318/400.21 |

FOREIGN PATENT DOCUMENTS

| | | |
|---|---|---|
| DE | 20117222 U1 | 1/2002 |
| EP | 0264350 A1 | 4/1988 |
| EP | 0465710 A1 | 1/1992 |
| JP | 2004-122258 A | 4/2004 |
| JP | 2008-236828 A | 10/2008 |
| JP | 2009-208158 A | 9/2009 |

* cited by examiner

SERVOMOTOR CONTROL DEVICE AND PRODUCTION SYSTEM EQUIPPED WITH THE CONTROL DEVICE

RELATED APPLICATIONS

The present application claims priority to Japanese Application Number 2014-015859, filed Jan. 30, 2014, the disclosure of which is hereby incorporated by reference herein in its entirety.

BACKGROUND OF THE INVENTION

Field of the Invention

The present invention relates to a servomotor control device and a production system equipped with the control device.

Description of the Related Art

In a production system, a robot and a positioner include motors in every drive shaft, and these motors are drive-controlled by a motor control device. For example, a servomotor is used for controlling rotation or trace of a workpiece arranged in the positioner. The motor control device instructs and controls motor speed, torque, and a position of a rotor, with respect to the motors for driving the drive shafts of the robot and the positioner, the number of which motors corresponds to the number of the drive shafts.

In the production system, a worker sometimes performs various operations, such as attaching/detaching of a workpiece to/from the positioner and performing of a confirming operation for confirming the operation state of the robot, in a movable range of the robot. When the worker works in the movable range of the robot, there is a common area that is an area in which a working range of the worker and the movable range of the robot are overlapped. In order to prevent accidental contact between the worker and the robot from occurring, a light curtain for detecting the entry of a worker into the common area is sometimes arranged. When the light curtain detects the entry of a worker into the common area, a robot having a movable range in the common area, and a servomotor for driving the robot are emergency-stopped. In a conventional production system, when emergency-stopping a servomotor, the servomotor is stopped by disconnecting a connection between a power source and the servomotor by an electromagnetic contactor arranged between the power source for supplying a power-supply voltage to the servomotor and a servo amplifier for controlling the servomotor.

However, there are various problems caused by emergency-stopping the servomotor by operating the electromagnetic contactor arranged between the servo amplifier and the power source every time the worker enters the common area. For example, by disconnecting the connection between the power source and the servo amplifier in the emergency stop, a capacitor arranged in the servo amplifier is discharged, and thus, the capacitor arranged in the servo amplifier is charged in restarting the servomotor. Since the capacitor of the servo amplifier is charged at every emergency stop, it takes time to emergency-stop and restart the servomotor, and the working efficiency of the production system may be decreased.

In addition, when the servomotor is emergency-stopped by performing an opening operation of the electromagnetic contactor every time the worker enters the common area, the number of opening/closing operations of the electromagnetic contactor may be considerably increased. When the servomotor is emergency-stopped by performing an opening operation of the electromagnetic contactor every time a workpiece arranged in a positioner of a robot is replaced, the replacement cycles for replacing the electromagnetic contactor, a relay circuit for operating the electromagnetic contactor and the like may be shortened.

In addition, the electromagnetic contactor is sometimes arranged between a plurality of servo amplifiers each of which controls a plurality of servomotors and a power source. When the electromagnetic contactor is arranged between the plurality of servo amplifiers and the power source, emergency-stopping a servomotor of a robot having a movable range in the common area may concurrently emergency-stop a servomotor of a robot not having a movable range in the common area. By emergency-stopping the servomotor of the robot not having a movable range in the common area, the working efficiency of the production system may be further decreased.

SUMMARY OF INVENTION

In view of the above-described problems, it is an object of the present invention to provide a servomotor control device capable of suppressing a decrease in the working efficiency due to an emergency stop of a servomotor, in a production system in which the servomotor is emergency-stopped when a worker enters a common area.

In order to achieve the above-described object, in a first aspect, a servomotor control device includes an inverter for driving a servomotor by converting a direct current into an alternating current and supplying the converted alternating current to the servomotor, a power source disconnect circuit for disconnecting supply of the direct current to the inverter, a servomotor control circuit for controlling the inverter such that the alternating current is supplied to the servomotor when receiving a safety signal, and for controlling the inverter such that the alternating current is not supplied to the servomotor when not receiving the safety signal, and a servomotor monitoring circuit for stopping the servomotor by stopping transmission of the safety signal to the servomotor control circuit when determining to stop the servomotor, and for stopping the servomotor by disconnecting the supply of the direct current to the inverter with the power source disconnect circuit and stopping the transmission of the safety signal when determining that at least one of the power source disconnect circuit and the servomotor control circuit is not normal.

In addition, in the above-described first aspect, the servomotor monitoring circuit includes a first operation circuit and a second operation circuit that is a separate circuit from the first operation circuit, and the servomotor may be stopped by disconnecting the supply of the direct current to the inverter with the power source disconnect circuit and stopping the transmission of the safety signal when the servomotor control circuit determines that the safety signal transmitted by the first operation circuit and the safety signal transmitted by the second operation circuit are not identical.

In addition, in the above-described first aspect, the servomotor monitoring circuit is arranged at a position away from a position where the servomotor control circuit is arranged, and the servomotor control circuit and the servomotor monitoring circuit may be connected through a communication path capable of transmitting the safety signal.

In addition, in the above-described first aspect, the servomotor control device further includes a converter for converting an alternating current into a direct current and supplying the converted direct current to the inverter, in which the power source disconnect circuit is an electromagnetic contactor for disconnecting a connection between a power source for supplying the alternating current to the converter, and the converter, and is an electromagnetic contactor including an auxiliary contact that mechanically works together with a main contact, and whether or not the power source disconnect circuit is normal may be determined by detecting a state of the auxiliary contact.

In addition, in the above-described first aspect, the power source disconnect circuit is a semiconductor circuit for disconnecting the supply of the direct current to the inverter, and the servomotor monitoring circuit may detect the direct current that is input to the inverter, and determine whether or not the semiconductor circuit is normal based on the detection result.

In addition, in the above-described first aspect, the servomotor control device further includes a brake control circuit for controlling a brake for stopping the servomotor, which is a regenerative brake or an electromagnetic brake, in which the servomotor monitoring circuit may stop the servomotor by disconnecting the supply of the direct current to the inverter with the power source disconnect circuit and stopping the transmission of the safety signal when the brake control circuit determines that the brake is not normal.

In a second aspect, a production system includes an entry detection sensor for detecting that a worker enters a common area that is an area in which a movable range of a first mechanical unit that mounts a first servomotor and a working range where the worker works are overlapped, a first inverter for driving the first servomotor by converting a direct current into an alternating current and supplying the converted alternating current to the first servomotor, a second inverter for driving a second servomotor by converting the direct current that has been converted by a converter into an alternating current and supplying the converted alternating current to the second servomotor mounted on a second mechanical unit whose movable range does not overlap with the common area, a power source disconnect circuit for disconnecting supply of the direct current to the inverter, a first servomotor control circuit for controlling the first inverter such that the alternating current is supplied to the first servomotor when receiving a safety signal, and for controlling the first inverter such that the alternating current is not supplied to the first servomotor when not receiving the safety signal, a second servomotor control circuit for controlling the second inverter such that the alternating current is supplied to the second servomotor when receiving a safety signal, and for controlling the second inverter such that the alternating current is not supplied to the second servomotor when not receiving the safety signal, and a servomotor monitoring circuit for stopping the first servomotor by stopping transmission of the safety signal to the first servomotor control circuit when the entry detection sensor detects that the worker enters the common area, and for stopping the first servomotor and the second servomotor by disconnecting the supply of the direct current to the inverter with the power disconnect circuit and stopping transmission of the safety signal to the first servomotor control circuit and the second servomotor control circuit when determining that at least one of the power source disconnect circuit, the safety signal, the first servomotor control circuit, and the second servomotor control circuit is not normal.

In a third aspect, a production system includes an entry detection sensor for detecting that a worker enters a common area that is an area in which a movable range of a mechanical unit that mounts a servomotor and a working range where the worker works are overlapped, a motor position detection sensor for detecting a position of the servomotor, an inverter for driving the servomotor by converting a direct current into an alternating current and supplying the converted alternating current to the servomotor, a power source disconnect circuit for disconnecting a connection between a power source for supplying an alternating current to a converter, and the converter, a servomotor control circuit for controlling the inverter such that the alternating current is supplied to the servomotor when receiving a safety signal, and for controlling the inverter such that the alternating current is not supplied to the servomotor when not receiving the safety signal, and a servomotor monitoring circuit for stopping the servomotor by stopping transmission of the safety signal to the servomotor control circuit when the entry detection sensor detects that the worker enters the common area and when determining that the mechanical unit interferes with the worker who has entered the common area, from a position of the servomotor detected by the motor position detection sensor, and for stopping the servomotor by disconnecting the supply of the direct current to the inverter with the power source disconnect circuit and stopping transmission of the safety signal to the servomotor control circuit when determining that at least one of the power source disconnect circuit, the safety signal, and the servomotor control circuit is not normal.

In addition, in the above-described third aspect, the servomotor monitoring circuit includes a first operation circuit for calculating a position of the mechanical unit, from the position of the servomotor detected by the motor position detection sensor, and a second operation circuit for calculating the position of the mechanical unit, from the position of the servomotor detected by the motor position detection sensor, which is a separate circuit from the first operation circuit, and the servomotor monitoring circuit may stop the servomotor by disconnecting the supply of the direct current to the inverter with the power source disconnect circuit and stopping the transmission of the safety signal to the servomotor control circuit when determining that the position of the mechanical unit calculated by the first operation circuit and the position of the mechanical unit calculated by the second operation circuit are not identical.

BRIEF DESCRIPTION OF DRAWINGS

The present invention will be understood more clearly with reference to the following accompanying drawings.

DETAILED DESCRIPTION

Hereinafter, with reference to the drawings, a servomotor control device and a production system equipped with the control device according to the present invention will be described with reference to First to Fifth Embodiments. However, it will be appreciated that the present invention is not limited to the drawings and Embodiments described below.

Figure 1:
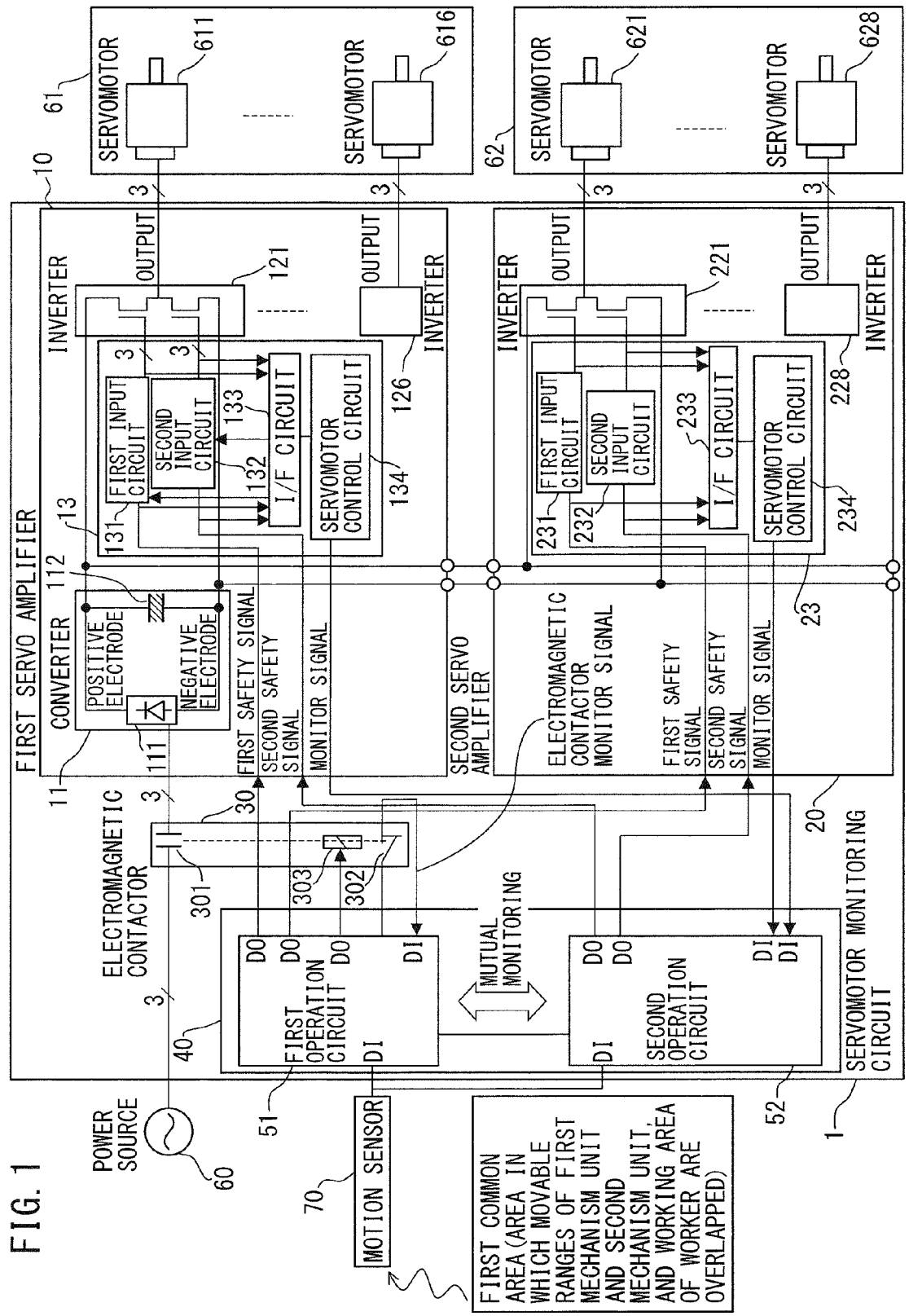
FIG. 1 is a block diagram illustrating a servomotor control device according to First Embodiment.

FIG. 1 is a block diagram illustrating a servomotor control device according to First Embodiment. Hereinafter, the same reference numerals in the different drawings indicate components having the same function.

A servomotor control device 1 according to First Embodiment includes a first servo amplifier 10, a second servo amplifier 20, an electromagnetic contactor 30, and a servomotor monitoring circuit 40.

The first servo amplifier 10 includes a converter 11, inverters 121 to 126, and a servomotor control circuit 13. The converter 11 includes a rectifier 111 and a capacitor 112, and converts an alternating current input from a three-phase alternating current input power source 60 into a direct current and outputs the direct current. Each of the inverters 121 to 126 converts the direct current output by the converter 11 into an alternating current and outputs the alternating current to each of servomotors 611 to 616 mounted on a first mechanical unit 61. The servomotor control circuit 13 outputs a pulse width modulation signal to each of the inverters 121 to 126, and controls each of the servomotors 611 to 616.

Figure 2:
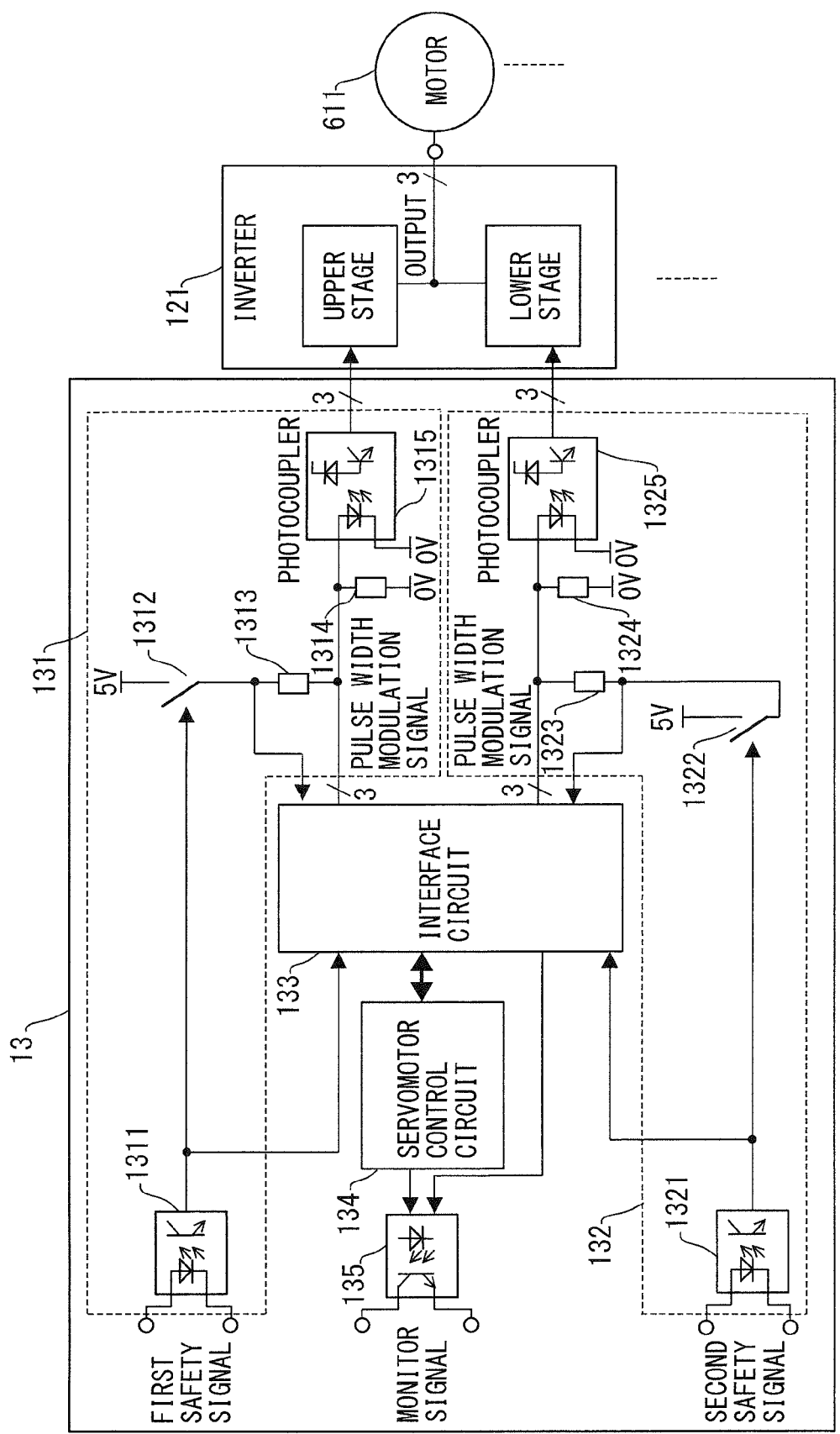
FIG. 2 is a partial block diagram of the inside of the servomotor control device illustrated in FIG. 1.

FIG. 2 is a block diagram illustrating the servomotor control circuit 13.

The servomotor control circuit 13 includes a first input circuit 131, a second input circuit 132, an interface circuit 133, a servomotor control circuit 134, and a monitor signal transmitter 135 that is a photocoupler.

The first input circuit 131 includes a first safety signal receiver 1311 that is a photocoupler, a first relay 1312, an eleventh resistor 1313, a twelfth resistor 1314, and a first pulse width modulation signal transmitter 1315 that is a photocoupler. The first safety signal receiver 1311 outputs an input first safety signal to the first relay 1312 and the interface circuit 133, respectively. The first relay 1312 is turned on when the first safety signal is input, and is turned off when the first safety signal is not input. The first relay 1312 supplies a power-supply voltage through the eleventh resistor 1313 to a three-phase first signal line to which the pulse width modulation signal is transmitted, while being on, and disconnects the supply of the power-supply voltage to the three-phase first signal line to which the pulse width modulation signal is transmitted, while being off. The first pulse width modulation signal transmitter 1315 outputs the pulse width modulation signal transmitted through the three-phase first signal line to each of the inverters 121 to 126.

The second input circuit 132 includes a second safety signal receiver 1321 that is a photocoupler, a second relay 1322, a twenty-first resistor 1323, a twenty-second resistor 1324, and a second pulse width modulation signal transmitter 1325 that is a photocoupler. The second safety signal receiver 1321 outputs a received second safety signal to the second relay 1322 and the interface circuit 133, respectively. The second relay 1322 is turned on when the second safety signal is received, and is turned off when the second safety signal is not received. The second relay 1322 supplies a power-supply voltage through the twenty-first resistor 1323 to a three-phase second signal line to which the pulse width modulation signal is transmitted, when being turned on, and disconnects the supply of the power-supply voltage to the three-phase second signal line to which the pulse width modulation signal is transmitted, when being turned off. The second pulse width modulation signal transmitter 1325 transmits the pulse width modulation signal transmitted through the three-phase second signal line to each of the inverters 121 to 126.

The interface circuit 133 outputs by open collector the pulse width modulation signal received from the servomotor control circuit 134 to the first signal line and the second signal line. Since the pulse width modulation signal is output by open collector from the interface circuit 133, when the first relay 1312 is turned off, the pulse width modulation signal is not transmitted to the first pulse width modulation signal transmitter 1315. In addition, when the second relay 1322 is turned off, the pulse width modulation signal is not transmitted to the second pulse width modulation signal transmitter 1325. The interface circuit 133 transmits the first safety signal, the second safety signal, and the signal indicating the on-off states of the first relay 1312 and the second relay 1322 to the servomotor control circuit 134.

The servomotor control circuit 134 is a CPU (Central Processing Unit), and performs various processing, such as outputting of the pulse width modulation signal, in accordance with a predetermined control program so as to drive the servomotors 611 to 616. In addition, when a failure occurs in the first input circuit 131, the second input circuit 132, the interface circuit 133, the servomotor control circuit 134, or the like, the servomotor control circuit 134 transmits a monitor signal through the interface circuit 133 and the monitor signal transmitter 135. In addition, the servomotor control circuit 134 determines whether or not the first safety signal and the second safety signal are identical and transmits the monitor signal through the interface circuit 133 and the monitor signal transmitter 135 when determining that the first safety signal and the second safety signal are not identical.

During the normal operation in which the first safety signal and the second safety signal are input, the servomotor control circuit 13 transmits the pulse width modulation signal to each of the inverters 121 to 126 to which the direct current is input from the converter 11, to drive each of the servomotors 611 to 616. When the transmission of any of the first safety signal and the second safety signal is stopped, the servomotor control circuit 13 disconnects the supply of the power-supply voltage to the signal line to which the pulse width modulation signal is transmitted and stops the transmission of the pulse width modulation signal output by open collector from the interface circuit 133. In addition, the servomotor control circuit 13 transmits the monitor signal when a failure occurs inside the first servo amplifier 10, and when determining that the first safety signal and the second safety signal are not identical.

The second servo amplifier 20 includes inverters 221 to 228 that convert the direct current output by the converter 11 arranged in the first servo amplifier 10 into an alternating current and output the alternating current to each of the servomotors 621 to 628 mounted on a second mechanical unit 62. In addition, the second servo amplifier 20 further includes a servomotor control circuit 23 that outputs the pulse width modulation signal to each of the inverters 221 to 228 and controls each of the servomotors 621 to 628.

The servomotor control circuit 23 includes a first input circuit 231, a second input circuit 232, an interface circuit 233, a servomotor control circuit 234, and a monitor signal transmitter 235 (not illustrated in the drawing). Each constituting element of the servomotor control circuit 23 has the same structure and function as each constituting element of the servomotor control circuit 13 except that they drive the different number of the servomotors.

The electromagnetic contactor 30 includes a main contact 301, an auxiliary contact 302 that mechanically works together with the main contact 301, and an operation coil 303 that opens/closes the main contact 301. When receiving a closing signal indicating an instruction to perform a closing operation at the operation coil 303, the electromagnetic contactor 30 closes the main contact 301 to electrically connect the power source 60 to the converter 11. In addition, when receiving an opening signal indicating an instruction to perform an opening operation at the operation coil 303, the electromagnetic contactor 30 opens the main contact 301 to disconnect the electrical connection between the power source 60 and the converter 11, and the supply of the direct current to the inverters 121 to 126 and 221 to 228 is disconnected.

The servomotor monitoring circuit 40 includes a first operation circuit 51 and a second operation circuit 52. The first operation circuit 51 and the second operation circuit 52 are connected to a motion sensor 70 that detects the entry of a worker into a first common area that is the area in which movable ranges of the first mechanical unit 61 and the second mechanical unit 62, and a working range where the worker works are overlapped. In addition, the first operation circuit 51 and the second operation circuit 52 have a function for mutually monitoring the operating state.

The first operation circuit 51 can transmit the first safety signal to each of the first servo amplifier 10 and the second servo amplifier 20. In addition, the first operation circuit 51 can determine whether or not the electromagnetic contactor 30 is normal by monitoring the auxiliary contact 302 or the like of the electromagnetic contactor 30. In addition, the first operation circuit 51 can transmit the closing signal and the opening signal to the operation coil 303 of the electromagnetic contactor 30. In addition, the first operation circuit 51 can receive, from the second operation circuit 52, a power source opening command signal indicating an instruction to transmit the opening signal to the operation coil 303 of the electromagnetic contactor 30.

When receiving an entry signal indicating that a worker enters the first common area, from the motion sensor 70, the first operation circuit 51 determines to stop the servomotors 611 to 616 and 621 to 628 so as to secure the safety of the worker. When determining to stop the servomotors 611 to 616 and 621 to 628 so as to secure the safety of the worker, the first operation circuit 51 stops the transmission of the first safety signal to both the first servo amplifier 10 and the second servo amplifier 20.

After receiving the entry signal from the motion sensor 70, the first operation circuit 51 determines whether or not it keeps receiving the entry signal from the motion sensor 70. When keeping receiving the entry signal from the motion sensor 70 after receiving the entry signal from the motion sensor 70, the first operation circuit 51 determines that the entry of a worker into the first common area continues. When not receiving the entry signal from the motion sensor 70 after receiving the entry signal from the motion sensor 70, the first operation circuit 51 determines that the entry of a worker into the first common area is finished. The first operation circuit 51 determines that the entry of a worker into the first common area is finished, and restarts the transmission of the first safety signal to both the first servo amplifier 10 and the second servo amplifier 20.

When receiving an electromagnetic contactor monitor signal indicating that the electromagnetic contactor 30 is not normal, from the auxiliary contact 302 or the like of the electromagnetic contactor 30, the first operation circuit 51 determines that the electromagnetic contactor 30 is not normal. When determining that the electromagnetic contactor 30 is not normal, the first operation circuit 51 stops the transmission of the first safety signal to both the first servo amplifier 10 and the second servo amplifier 20 and transmits the opening signal to the operation coil 303 of the electromagnetic contactor 30. In addition, when receiving the power source opening command signal from the second operation circuit 52, the first operation circuit 51 determines that a failure occurs inside the first servo amplifier 10 or the second servo amplifier 20, or that the first safety signal and the second safety signal are not identical. Then, the first operation circuit 51 stops the transmission of the first safety signal to both the first servo amplifier 10 and the second servo amplifier 20, and transmits the opening signal to the operation coil 303 of the electromagnetic contactor 30.

The second operation circuit 52 can transmit the second safety signal to each of the first servo amplifier 10 and the second servo amplifier 20. In addition, the second operation circuit 52 can receive the monitor signal from each of the first servo amplifier 10 and the second servo amplifier 20. In addition, the second operation circuit 52 can transmit the power source opening command signal to the first operation circuit 51.

When receiving the entry signal indicating that a worker enters the first common area, from the motion sensor 70, the second operation circuit 52 determines to stop the servomotors 611 to 616 and 621 to 628 so as to secure the safety of the worker. When determining to stop the servomotors 611 to 616 and 621 to 628 so as to secure the safety of the worker, the second operation circuit 52 stops the transmission of the second safety signal to both the first servo amplifier 10 and the second servo amplifier 20.

After receiving the entry signal from the motion sensor 70, the second operation circuit 52 determines whether or not it keeps receiving the entry signal from the motion sensor 70. When keeping receiving the entry signal from the motion sensor 70 after receiving the entry signal from the motion sensor 70, the second operation circuit 52 determines that the entry of a worker into the first common area continues. When not receiving the entry signal from the motion sensor 70 after receiving the entry signal from the motion sensor 70, the second operation circuit 52 determines that the entry of a worker into the first common area is finished. The second operation circuit 52 determines that the entry of a worker into the first common area is finished, and restarts the transmission of the second safety signal to both the first servo amplifier 10 and the second servo amplifier 20.

In addition, when receiving the monitor signal from the first servo amplifier 10 or the second servo amplifier 20, the second operation circuit 52 determines that a failure occurs inside the first servo amplifier 10 or the second servo amplifier 20, or that the first safety signal and the second safety signal are not identical. Then, the second operation circuit 52 stops the transmission of the second safety signal to both the first servo amplifier 10 and the second servo amplifier 20, and transmits the power source opening command signal to the first operation circuit 51.

The power source 60 supplies a three-phase alternating current to the converter 11 through a three-phase power line whose electrical connection is opened/closed by the electromagnetic contactor 30. The first mechanical unit 61 mounts the servomotors 611 to 616, and can move in a predetermined movable range. The second mechanical unit 62 mounts the servomotors 621 to 628, and can move in a predetermined movable range.

The motion sensor 70 is a light curtain as one example, and detects the entry of a worker into the first common area that is the area in which the movable ranges of the first mechanical unit 61 and the second mechanical unit 62, and the working range where the worker works are overlapped.

Figure 3:
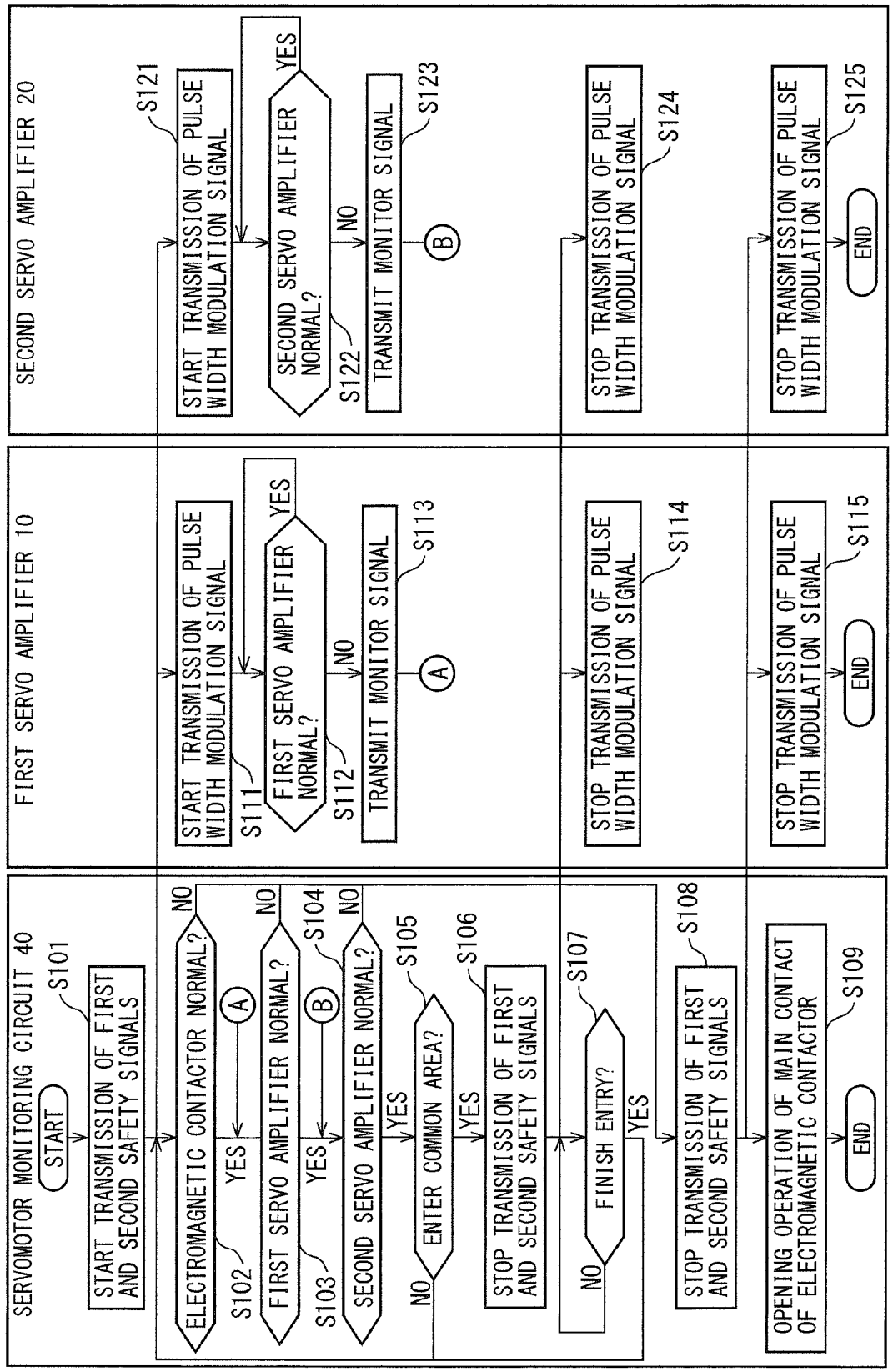
FIG. 3 is a flowchart illustrating an operation flow of the servomotor control device illustrated in FIG. 1.

FIG. 3 is a flowchart illustrating a processing flow of the servomotor control device 1.

Firstly, the servomotor monitoring circuit 40 determines whether or not the electromagnetic contactor 30 is normal, and when it is determined to be normal, a power source of the servomotor control device 1 is turned on by the closing operation or the like of the electromagnetic contactor 30 to start the processing (not illustrated in the flowchart). When the power source of the servomotor control device 1 is turned on, in Step S101, the servomotor monitoring circuit 40 transmits the first safety signal and the second safety signal to each of the first servo amplifier 10 and the second servo amplifier 20. More specifically, the first operation circuit 51 of the servomotor monitoring circuit 40 transmits the first safety signal to each of the first servo amplifier 10 and the second servo amplifier 20, and the second operation circuit 52 of the servomotor monitoring circuit 40 transmits the second safety signal to each of the first servo amplifier 10 and the second servo amplifier 20.

In Step S111, when receiving the first safety signal and the second safety signal, the first servo amplifier 10 starts the transmission of the pulse width modulation signal so as to drive the servomotors 611 to 616. In addition, in Step S121, when receiving the first safety signal and the second safety signal, the second servo amplifier 20 starts the transmission of the pulse width modulation signal so as to drive the servomotors 621 to 628.

Next, in Step S102, the servomotor monitoring circuit 40 determines whether or not the electromagnetic contactor 30 is normal. Specifically, the first operation circuit 51 of the servomotor monitoring circuit 40 determines whether or not the electromagnetic contactor monitor signal indicating that the electromagnetic contactor 30 is not normal is received from the auxiliary contact 302 or the like of the electromagnetic contactor 30. When the electromagnetic contactor monitor signal is not received from the auxiliary contact 302 or the like of the electromagnetic contactor 30 and the servomotor monitoring circuit 40 determines that the electromagnetic contactor 30 is normal, the processing proceeds to Step S103. In addition, when the electromagnetic contactor monitor signal is received from the auxiliary contact 302 or the like of the electromagnetic contactor 30 and the servomotor monitoring circuit 40 determines that the electromagnetic contactor 30 is not normal, the processing proceeds to Step S108.

When the processing proceeds to Step S103, the servomotor monitoring circuit 40 determines whether or not the first servo amplifier 10 is normal. Specifically, the second operation circuit 52 of the servomotor monitoring circuit 40 determines whether or not the monitor signal is received from the first servo amplifier 10. When the monitor signal is not received from the first servo amplifier 10 and the servomotor monitoring circuit 40 determines that the first servo amplifier 10 is normal, the processing proceeds to Step S104. In addition, when the monitor signal is received from the first servo amplifier 10 and the servomotor monitoring circuit 40 determines that the first servo amplifier 10 is not normal, the processing proceeds to Step S108.

When the processing proceeds to Step S104, the servomotor monitoring circuit 40 determines whether or not the second servo amplifier 20 is normal. Specifically, the second operation circuit 52 of the servomotor monitoring circuit 40 determines whether or not the monitor signal is received from the second servo amplifier 20. When the monitor signal is not received from the second servo amplifier 20 and the servomotor monitoring circuit 40 determines that the second servo amplifier 20 is normal, the processing proceeds to Step S105. In addition, when the monitor signal is received from the second servo amplifier 20 and the servomotor monitoring circuit 40 determines that the second servo amplifier 20 is not normal, the processing proceeds to Step S108.

When the processing proceeds to Step S105, the servomotor monitoring circuit 40 determines whether or not a worker enters the first common area that is the area in which the movable ranges of the first mechanical unit 61 and the second mechanical unit 62, and the working range where the worker works are overlapped. Specifically, each of the first operation circuit 51 and the second operation circuit 52 of the servomotor monitoring circuit 40 determines whether or not the entry signal indicating that a worker enters the first common area is received from the motion sensor 70. When the servomotor monitoring circuit 40 determines that a worker enters the first common area, the processing proceeds to Step S106. In addition, when the servomotor monitoring circuit 40 determines that a worker does not enter the first common area, the processing returns to Step S102.

In Step S105, the servomotor monitoring circuit 40 repeats the processing of Steps S102 to S105 until determining that a worker enters the first common area to determine whether or not the first servo amplifier 10, the second servo amplifier 20, and the electromagnetic contactor 30 are normal.

On the other hand, in the first servo amplifier 10, when the transmission of the pulse width modulation signal is started in Step S111, the processing proceeds to Step S112. In Step S112, the first servo amplifier 10 determines whether or not a failure occurs inside the first servo amplifier 10 and determines whether or not the first safety signal received from the first operation circuit 51 and the second safety signal received from the second operation circuit 52 are identical. In Step S112, the first servo amplifier 10 repeats the processing of Step S112 during the transmission of the pulse width modulation signal, until determining that a failure occurs inside the first servo amplifier 10, or determining that the first safety signal and the second safety signal are not identical. In Step S112, the first servo amplifier 10 determines that a failure occurs inside the first servo amplifier 10, or determines that the first safety signal and the second safety signal are not identical, the processing proceeds to Step S113. Next, in Step S113, the first servo amplifier 10 transmits the monitor signal to the servomotor monitoring circuit 40, and the processing proceeds to Step S103.

Similarly, in the second servo amplifier 20, when the transmission of the pulse width modulation signal is started in Step S121, the processing proceeds to Step S122. In Step S122, the second servo amplifier 20 determines whether or not a failure occurs inside the second servo amplifier 20 and determines whether or not the first safety signal and the second safety signal are identical. In Step S122, the second servo amplifier 20 repeats the processing of Step S122 during the transmission of the pulse width modulation signal, until determining that a failure occurs inside the second servo amplifier 20, or determining that the first safety signal and the second safety signal are not identical. In Step S122, the second servo amplifier 20 determines that a failure occurs inside the second servo amplifier 20, or determines that the first safety signal and the second safety signal are not identical, the processing proceeds to Step S123. Next, in Step S123, the second servo amplifier 20 transmits the monitor signal to the servomotor monitoring circuit 40, and the processing proceeds to Step S104.

When the servomotor monitoring circuit 40 determines that a worker enters the first common area in Step S105 and the processing proceeds to Step S106, the servomotor monitoring circuit 40 stops the transmission of the first safety signal and the second safety signal. More specifically, the first operation circuit 51 of the servomotor monitoring circuit 40 stops the transmission of the first safety signal to each of the first servo amplifier 10 and the second servo amplifier 20. In addition, the second operation circuit 52 of the servomotor monitoring circuit 40 stops the transmission of the second safety signal to the first servo amplifier 10 and the second servo amplifier 20.

When the transmission of the first safety signal and the second safety signal is stopped, in Step S114, the first servo amplifier 10 stops the transmission of the pulse width modulation signal to stop the servomotors 611 to 616. Similarly, in Step S124, the second servo amplifier 20 stops the transmission of the pulse width modulation signal to stop the servomotors 621 to 628.

Next, in Step S107, the servomotor monitoring circuit 40 determines whether or not the worker who has entered the first common area leaves from the first common area. The servomotor monitoring circuit 40 repeats the processing of Step S107 until determining that the worker who has entered the first common area leaves from the first common area.

When the servomotor monitoring circuit 40 determines that the worker who has entered the first common area leaves from the first common area in Step S107, the processing returns to Step S102. Then, the servomotor monitoring circuit 40 repeats the processing of Steps S102 to S107 until determining that any of the first servo amplifier 10, the second servo amplifier 20, and the electromagnetic contactor 30 is not normal. When any of the first servo amplifier 10, the second servo amplifier 20, and the electromagnetic contactor 30 is determined to be not normal, the processing proceeds to Step S108.

In Step S108, the servomotor monitoring circuit 40 stops the transmission of the first safety signal and the second safety signal in the same manner as Step S106.

Next, in Step S109, the servomotor monitoring circuit 40 disconnects the electrical connection between the power source 60 and the converter 11 by the opening operation of the main contact 301 of the electromagnetic contactor 30. More specifically, the first operation circuit 51 of the servomotor monitoring circuit 40 transmits the opening signal to the operation coil 303 of the electromagnetic contactor 30.

In the servomotor control device 1, when determining that a worker enters the first common area, the servomotor monitoring circuit 40 stops the transmission of the pulse width modulation signal to stop the servomotors without the opening operation of the electromagnetic contactor 30. When stopping the servomotors, the connection between the power source 60 and the converter 11 is not disconnected by the opening operation of the electromagnetic contactor 30, and therefore, in the servomotor control device 1, the capacitor 112 of the converter 11 is not discharged and quick restart is possible. In addition, since the number of operations of the electromagnetic contactor 30 can also be kept low, the replacement cycles for replacing the electromagnetic contactor 30, a relay circuit for operating the electromagnetic contactor 30, and the like can be relatively lengthened.

Figure 4:
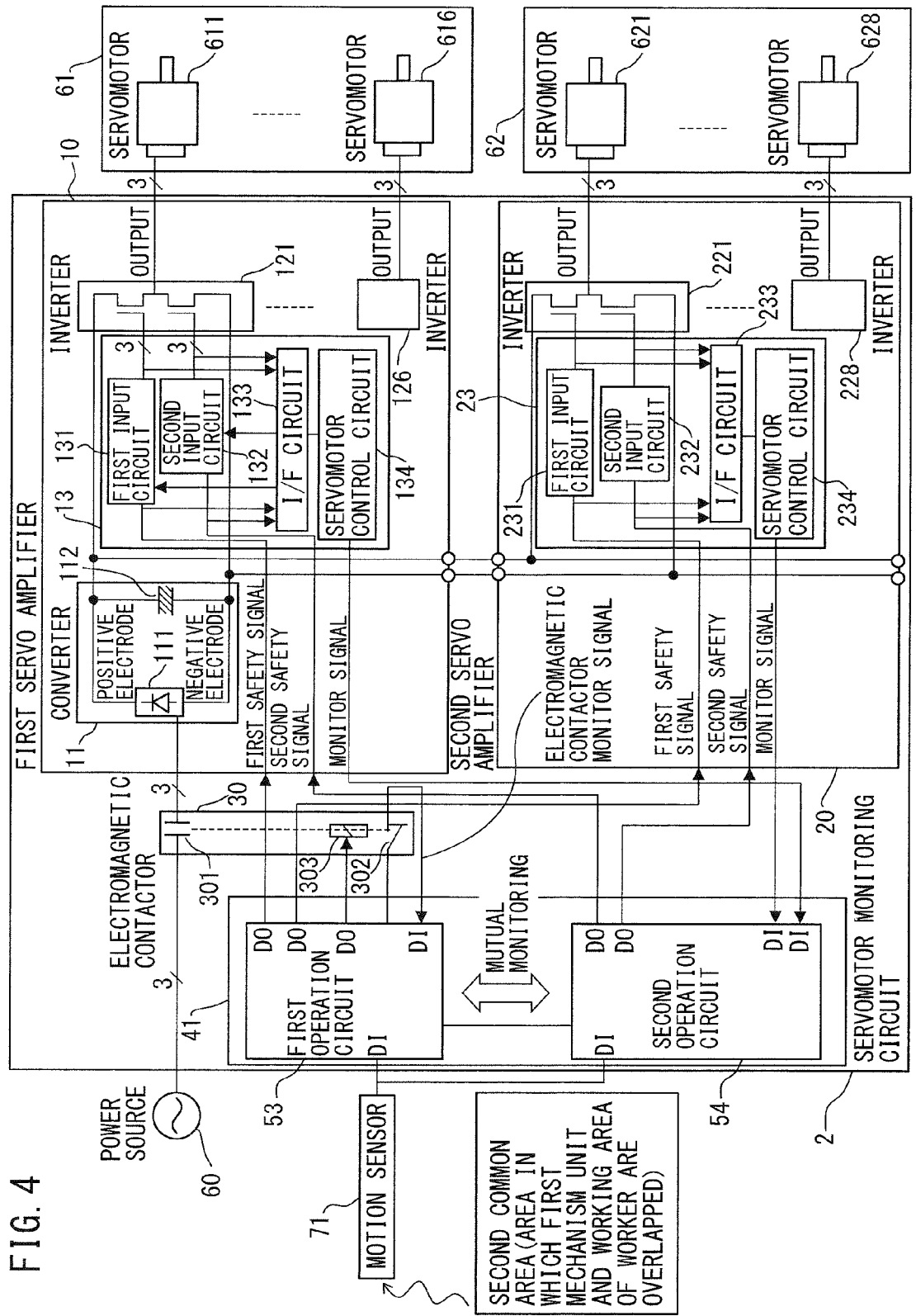
FIG. 4 is a block diagram illustrating a servomotor control device according to Second Embodiment.

FIG. 4 is a block diagram illustrating a servomotor control device according to Second Embodiment.

A servomotor control device 2 according to Second Embodiment is different from the servomotor control device 1 according to First Embodiment in that a servomotor monitoring circuit 41 is arranged in place of the servomotor monitoring circuit 40.

The servomotor monitoring circuit 41 is different from the servomotor monitoring circuit 40 in that a first operation circuit 53 and a second operation circuit 54 are arranged in place of the first operation circuit 51 and the second operation circuit 52. In addition, the servomotor monitoring circuit 41 is different from the servomotor monitoring circuit 40 in that a motion sensor 71 is connected in place of the motion sensor 70. The area detected by the motion sensor 71 connected to the servomotor monitoring circuit 41 is different from the area detected by the motion sensor 70 connected to the servomotor monitoring circuit 40. The first common area detected by the motion sensor 70 connected to the servomotor monitoring circuit 40 is the area in which the movable ranges of the first mechanical unit 61 and the second mechanical unit 62, and the working range where the worker works are overlapped. On the other hand, a second common area detected by the motion sensor 71 connected to the servomotor monitoring circuit 41 is the area in which the movable range of the first mechanical unit 61 and the working range where the worker works are overlapped. In the servomotor control device 2, the movable range of the second mechanical unit 62 and the working range where the worker works are not overlapped, and thus, the movable range of the second mechanical unit 62 is not included in the second common area.

When receiving an entry signal indicating that a worker enters the second common area, from the motion sensor 71, the first operation circuit 53 determines to stop the servomotors 611 to 616 so as to secure the safety of the worker and stops the transmission of the first safety signal to the first servo amplifier 10, but since the servomotors 621 to 628 are not stopped, the first operation circuit 53 does not stop the transmission of the first safety signal to the second servo amplifier 20.

When receiving the entry signal indicating that a worker enters the second common area, from the motion sensor 71, the second operation circuit 54 determines to stop the servomotors 611 to 616 so as to secure the safety of the worker and stops the transmission of the second safety signal to the first servo amplifier 10, but since the servomotors 621 to 628 are not stopped, the second operation circuit 52 does not stop the transmission of the second safety signal to the second servo amplifier 20.

Figure 5:
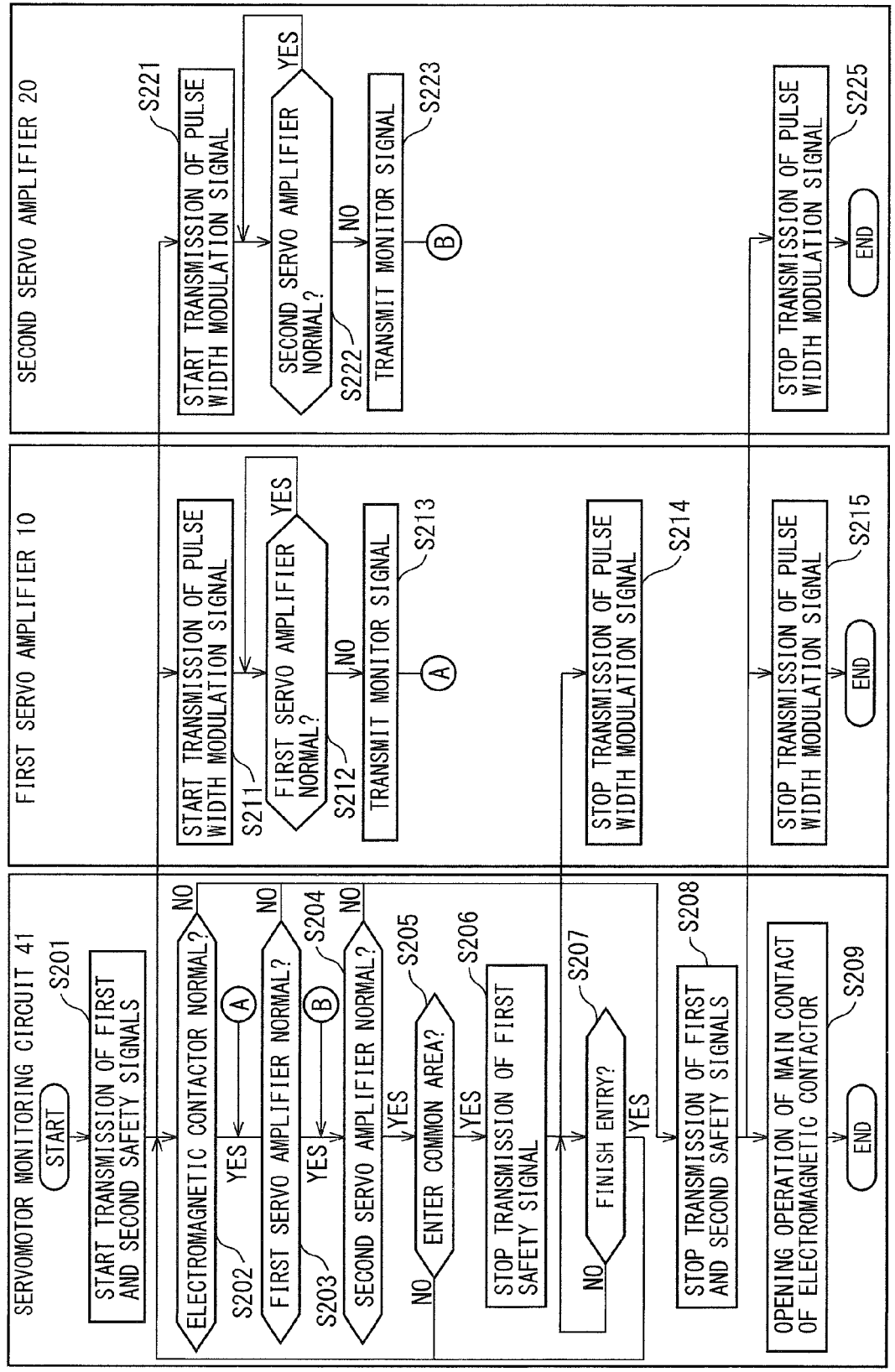
FIG. 5 is a flowchart illustrating an operation flow of the servomotor control device illustrated in FIG. 4.

FIG. 5 is a flowchart illustrating a processing flow of the servomotor control device 2.

The processing of each of Steps S201 to S205 and S207 to S209 of the servomotor monitoring circuit 41 corresponds to the processing of each of Steps S101 to S105 and S107 to S109 of the servomotor monitoring circuit 40 illustrated in FIG. 3. The processing of each of Steps S211 to S215 of the first servo amplifier 10 corresponds to the processing of each of Steps S111 to S115 illustrated in FIG. 3. The processing of each of Steps S221 to S223 and S225 of the second servo amplifier 20 corresponds to the processing of each of Steps S121 to S123 and S125 illustrated in FIG. 3.

When the servomotor monitoring circuit 41 determines that a worker enters the second common area in Step S205 and the processing proceeds to Step S206, the servomotor monitoring circuit 41 stops the transmission of the first safety signal and the second safety signal to the first servo amplifier 10. More specifically, the first operation circuit 53 of the servomotor monitoring circuit 41 stops the transmission of the first safety signal to the first servo amplifier 10, and the second operation circuit 54 of the servomotor monitoring circuit 40 stops the transmission of the second safety signal to the first servo amplifier 10.

When the transmission of the first safety signal and the second safety signal to the first servo amplifier 10 is stopped, in Step S214, the first servo amplifier 10 stops the transmission of the pulse width modulation signal to stop the servomotors 611 to 616. On the other hand, the first safety signal and the second safety signal continue to be transmitted to the second servo amplifier 20, and thus, the second servo amplifier 20 transmits the pulse width modulation signal to continue the driving of the servomotors 621 to 628.

In the servomotor control device 2, when determining that a worker enters the second common area, the servomotor monitoring circuit 41 stops the servomotors 611 to 616 arranged in the first mechanical unit 61 whose movable range is included in the second common area. On the other hand, when determining that a worker enters the second common area, the servomotor monitoring circuit 41 continues the driving of the servomotors 621 to 628 arranged in the second mechanical unit 62 whose movable range is not included in the second common area. In the servomotor control device 2, the driving of the servomotors 621 to 628 arranged in the second mechanical unit 62 whose movable range is not included in the second common area is continued, and therefore, a decrease in the working efficiency of a production system can be minimized.

Figure 6:
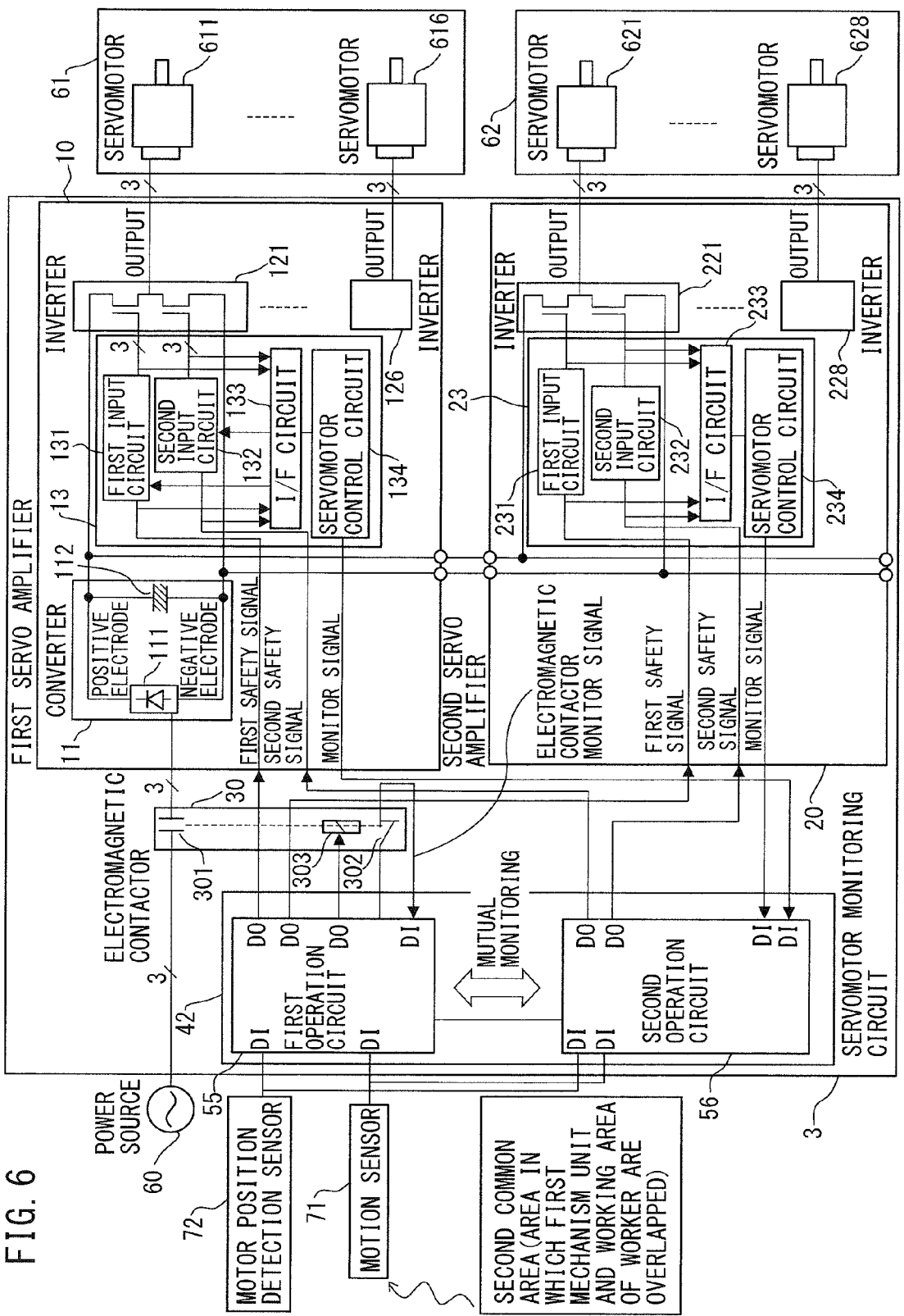
FIG. 6 is a block diagram illustrating a servomotor control device according to Third Embodiment.

FIG. 6 is a block diagram illustrating a servomotor control device according to Third Embodiment.

A servomotor control device 3 according to Third Embodiment is different from the servomotor control device 2 according to Second Embodiment in that a servomotor monitoring circuit 42 is arranged in place of the servomotor monitoring circuit 41.

The servomotor monitoring circuit 42 is different from the servomotor monitoring circuit 41 in that a first operation circuit 55 and a second operation circuit 56 are arranged in place of the first operation circuit 53 and the second operation circuit 54. In addition, the servomotor monitoring circuit 42 is different from the servomotor monitoring circuit 41 in that a motor position detection sensor 72 for detecting the position of the servomotor 611 is further connected.

The motor position detection sensor 72 is a rotary encoder as one example, and is a sensor that is attached to the servomotors 611 to 616 and the servomotors 621 to 628 and detects the position of each servomotor.

When receiving an entry signal indicating that a worker enters the second common area, from the motion sensor 71, each of the first operation circuit 55 and the second operation circuit 56 receives a position signal indicating detected positional information, from the motor position detection sensor 72. Next, each of the first operation circuit 55 and the second operation circuit 56 calculates positional information indicating the position of the first mechanical unit 61 based on positional information corresponding to the received position signal. Next, each of the first operation circuit 55 and the second operation circuit 56 exchanges the positional information calculated by both sides and confirms that the positional information calculated by both sides is right.

When both the first operation circuit 55 and the second operation circuit 56 confirm that the calculated positional information is right, both the first operation circuit 55 and the second operation circuit 56 determine whether or not the position indicated by the calculated positional information of the first mechanical unit 61 interferes by being included in the second common area. When determining that the position indicated by the calculated positional information of the first mechanical unit 61 interferes with the second common area, the first operation circuit 55 stops the transmission of the first safety signal to the first servo amplifier 10. In addition, when determining that the calculated position of the first mechanical unit 61 interferes with the second common area, the second operation circuit 56 stops the transmission of the second safety signal to the first servo amplifier 10.

Figure 7:
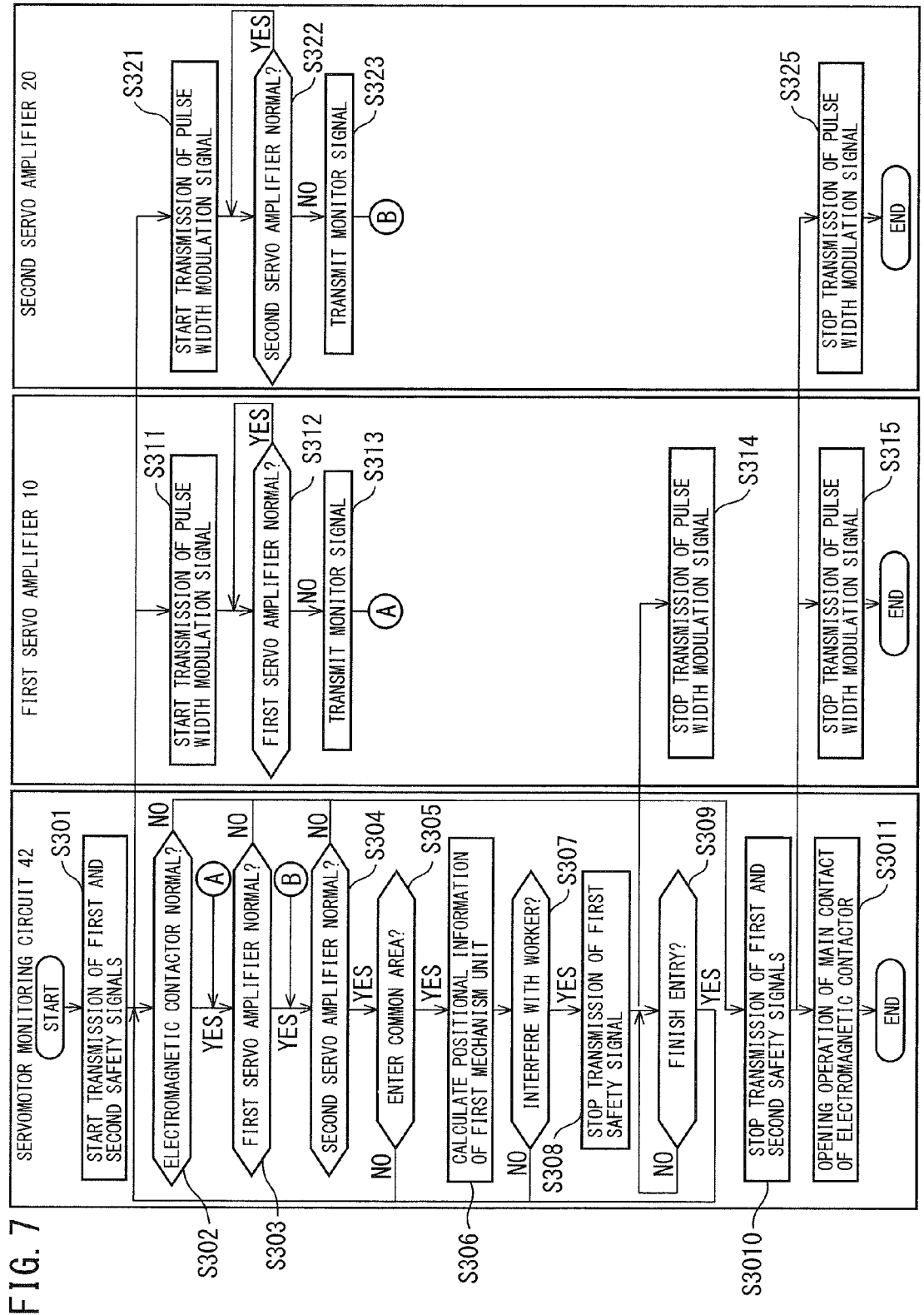
FIG. 7 is a flowchart illustrating an operation flow of the servomotor control device illustrated in FIG. 6.

FIG. 7 is a flowchart illustrating a processing flow of the servomotor control device 3.

The processing of each of Steps S301 to S305 and S309 to S3011 of the servomotor monitoring circuit 42 corresponds to the processing of each of Steps S201 to S205 and S207 to S209 of the servomotor monitoring circuit 41 illustrated in FIG. 5. The processing of each of Steps S311 to S315 of the first servo amplifier 10 corresponds to the processing of each of Steps S211 to S215 illustrated in FIG. 5. The processing of each of Steps S321 to S323 and S325 of the second servo amplifier 20 corresponds to the processing of each of Steps S221 to S223 and S225 illustrated in FIG. 5.

When the servomotor monitoring circuit 42 determines that a worker enters the second common area in Step S305 and the processing proceeds to Step S306, the servomotor monitoring circuit 42 calculates positional information of the first mechanical unit 61. More specifically, each of the first operation circuit 55 and the second operation circuit 56 receives a position signal indicating positional information detected by the motor position detection sensor 72. Next, each of the first operation circuit 55 and the second operation circuit 56 calculates positional information indicating the position of the first mechanical unit 61 based on positional information corresponding to the received position signal. Next, each of the first operation circuit 55 and the second operation circuit 56 exchanges the positional information calculated by both sides and confirms that the positional information calculated by both sides is right.

Next, in Step S307, the servomotor monitoring circuit 42 determines whether or not the first mechanical unit 61 interferes with the worker by being included in the second common area. More specifically, each of the first operation circuit 55 and the second operation circuit 56 determines whether or not the position indicated by the positional information of the first mechanical unit 61, calculated in Step S306, is included in the second common area. When determining that the position indicated by the calculated positional information of the first mechanical unit 61 is not included in the second common area and the first mechanical unit 61 may not interfere with the worker, the processing returns to Step S302. When determining that the position indicated by the calculated positional information of the first mechanical unit 61 is included in the second common area and the first mechanical unit 61 may interfere with the worker, the processing proceeds to Step S308.

When the processing proceeds to Step S308, the transmission of the first safety signal and the second safety signal to the first servo amplifier 10 is stopped. More specifically, the first operation circuit 55 of the servomotor monitoring circuit 42 stops the transmission of the first safety signal to the first servo amplifier 10, and the second operation circuit 56 of the servomotor monitoring circuit 40 stops the transmission of the second safety signal to the first servo amplifier 10.

When the transmission of the first safety signal and the second safety signal to the first servo amplifier 10 is stopped, in Step S314, the first servo amplifier 10 stops the transmission of the pulse width modulation signal to stop the servomotors 611 to 616.

In the servomotor control device 3, when determining that a worker enters the second common area, the servomotor monitoring circuit 42 determines whether or not the first mechanical unit 61 interferes with the worker. When determining that the first mechanical unit 61 interferes with the worker, the servomotor monitoring circuit 42 stops the servomotors 611 to 616 arranged in the first mechanical unit 61. On the other hand, when determining that the first mechanical unit 61 does not interfere with the worker, the servomotor monitoring circuit 42 continues the driving of the servomotors 611 to 616 arranged in the first mechanical unit 61. In the servomotor control device 3, the driving of the servomotors 611 to 616 arranged in the first mechanical unit 61 is continued when determining that the first mechanical unit 61 does not interfere with the worker, and therefore, the working efficiency of a production system can be improved.

Figure 8:
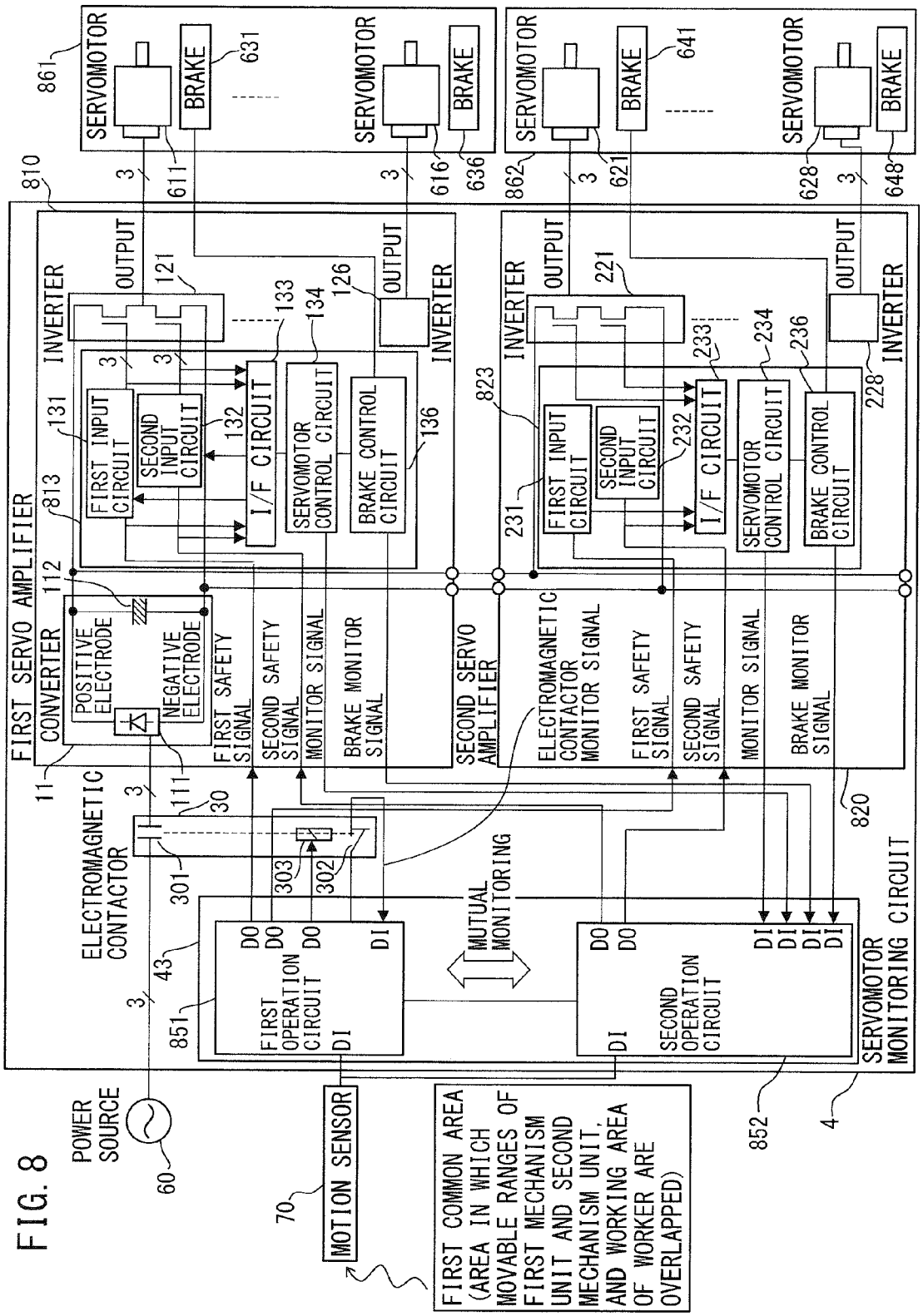
FIG. 8 is a block diagram illustrating a servomotor control device according to Fourth Embodiment.

FIG. 8 is a block diagram illustrating a servomotor control device according to Fourth Embodiment.

A servomotor control device 4 according to Fourth Embodiment is different from the servomotor control device 1 according to First Embodiment in that a first servo amplifier 810 and a second servo amplifier 820 are arranged in place of the first servo amplifier 10 and the second servo amplifier 20. In addition, the servomotor control device 4 according to Fourth Embodiment is different from the servomotor control device 1 according to First Embodiment in that a servomotor monitoring circuit 43 is arranged in place of the servomotor monitoring circuit 40.

The first servo amplifier 810 is different from the first servo amplifier 10 in having a brake control circuit 136. The brake control circuit 136 performs various processing in accordance with a predetermined control program so as to control brakes 631 to 636. The respective brakes 631 to 636 have a function of stopping the driving of the servomotors 611 to 616 arranged in a first mechanical unit 861, based on an instruction of the brake control circuit 136. The brakes 631 to 636 are regenerative brakes for stopping the servomotors 611 to 616 using regenerative energy of the servomotors 611 to 616, or electromagnetic brakes for stopping the servomotors 611 to 616 using mechanical friction force.

The brake control circuit 136 determines whether or not each of the brakes 631 to 636 is normal, and transmits a brake monitor signal when any of the brakes 631 to 636 is determined to be not normal.

The second servo amplifier 820 is different from the second servo amplifier 20 in having a brake control circuit 236. The brake control circuit 236 performs various processing in accordance with a predetermined control program so as to control brakes 641 to 648. The respective brakes 641 to 648 have a function of stopping the driving of the servomotors 621 to 628 arranged in a second mechanical unit 862, based on an instruction of the brake control circuit 236. The brakes 641 to 648 are regenerative brakes for stopping the servomotors 621 to 628 using regenerative energy of the servomotors 621 to 628, or electromagnetic brakes for stopping the servomotors 621 to 628 using mechanical friction force.

The brake control circuit 236 determines whether or not each of the brakes 641 to 648 is normal, and transmits a brake monitor signal when any of the brakes 641 to 648 is determined to be not normal.

The servomotor monitoring circuit 43 is different from the servomotor monitoring circuit 40 in that a second operation circuit 852 is arranged in place of the second operation circuit 52. In addition to the function of the second operation circuit 52, the second operation circuit 852 has a function of stopping the servomotors when a failure occurs in the brakes 631 to 636 or 641 to 648. The second operation circuit 852 can receive the monitor signal and the brake monitor signal from each of the first servo amplifier 810 and the second servo amplifier 820. When receiving the brake monitor signal from the first servo amplifier 810 or the second servo amplifier 820, the second operation circuit 852 determines that a failure occurs in the brakes 631 to 636 or 641 to 648. Next, the second operation circuit 852 transmits the power source opening command signal to the first operation circuit 851. Next, the first operation circuit 851 and the second operation circuit 852 stop the transmission of the first safety signal to both the first servo amplifier 10 and the second servo amplifier 20. In addition, the first operation circuit 851 transmits the opening signal to the operation coil 303 of the electromagnetic contactor 30, and the electromagnetic contactor 30 that has received the opening signal disconnects the electrical connection between the power source 60 and the converter 11 by the opening operation of the main contact 301.

Figure 9:
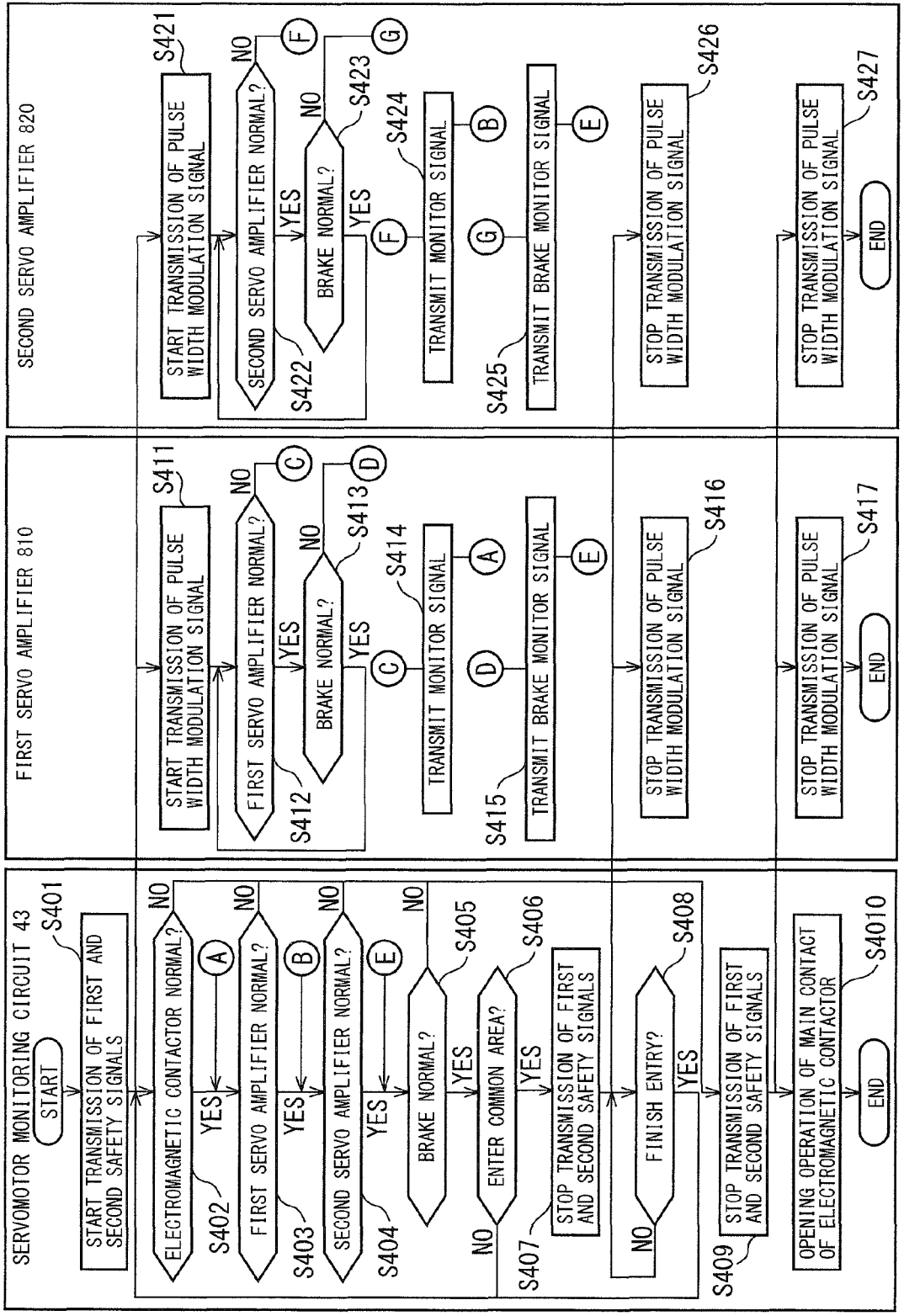
FIG. 9 is a flowchart illustrating an operation flow of the servomotor control device illustrated in FIG. 8.

FIG. 9 is a flowchart illustrating a processing flow of the servomotor control device 4.

The processing of each of Steps S401 to S404 and S406 to S4010 of the servomotor monitoring circuit 43 corresponds to the processing of each of Steps S101 to S104 and S105 to S109 of the servomotor monitoring circuit 40 illustrated in FIG. 3. The processing of each of Steps S411, S412, S414, and S416 to S417 of the first servo amplifier 810 corresponds to the processing of each of Steps S111 to S115 of the first servo amplifier 10 illustrated in FIG. 3. The processing of each of Steps S421, S422, S424, and S426 to S427 of the second servo amplifier 820 corresponds to the processing of each of Steps S121 to S125 of the second servo amplifier 20 illustrated in FIG. 3.

When the processing proceeds to Step S405, the servomotor monitoring circuit 43 determines whether or not the brakes 631 to 636 and 641 to 648 are normal. Specifically, the second operation circuit 852 of the servomotor monitoring circuit 43 determines whether or not the brake monitor signal is received from any of the first servo amplifier 810 and the second servo amplifier 820. When the brake monitor signal is not received from any of the first servo amplifier 810 and the second servo amplifier 820 and the servomotor monitoring circuit 43 determines that the brakes 631 to 636 and 641 to 648 are normal, the processing proceeds to Step S406. In addition, when the brake monitor signal is received from any of the first servo amplifier 810 and the second servo amplifier 820 and the servomotor monitoring circuit 43 determines that the brakes 631 to 636 and 641 to 648 is not normal, the processing proceeds to Step S409.

When the processing proceeds to Step S409, the servomotor monitoring circuit 43 stops the transmission of the first safety signal and the second safety signal in the same manner as the processing of Step S108. Next, in Step S4010, the servomotor monitoring circuit 43 disconnects the electrical connection between the power source 60 and the converter 11 by the opening operation of the main contact 301 of the electromagnetic contactor 30.

When the processing proceeds to Step S413, the brake control circuit 136 of the first servo amplifier 810 determines whether or not each of the brakes 631 to 636 is normal. When the brake control circuit 136 of the first servo amplifier 810 determines that each of the brakes 631 to 636 is normal, the processing returns to Step S412. In addition, when the brake control circuit 136 of the first servo amplifier 810 determines that any of the brakes 631 to 636 is not normal, the processing proceeds to Step S415.

When the processing proceeds to Step S415, the brake control circuit 136 of the first servo amplifier 810 transmits the brake monitor signal to the servomotor monitoring circuit 43, and the processing proceeds to Step S405.

When the processing proceeds to Step S423, the brake control circuit 236 of the second servo amplifier 820 determines whether or not each of the brakes 641 to 648 is normal. When the brake control circuit 236 of the second servo amplifier 820 determines that each of the brakes 641 to 648 is normal, the processing returns to Step S422. In addition, when the brake control circuit 236 of the second servo amplifier 820 determines that any of the brakes 641 to 648 is not normal, the processing proceeds to Step S425.

When the processing proceeds to Step S425, the brake control circuit 236 of the second servo amplifier 820 transmits the brake monitor signal to the servomotor monitoring circuit 43, and the processing proceeds to Step S405.

In the servomotor control device 4, when a failure occurs in any of the brakes 631 to 636 and 641 to 648, the electrical connection between the power source 60 and the converter 11 is disconnected by the opening operation of the electromagnetic contactor 30, and therefore, the servomotors can be more reliably stopped.

Figure 10:
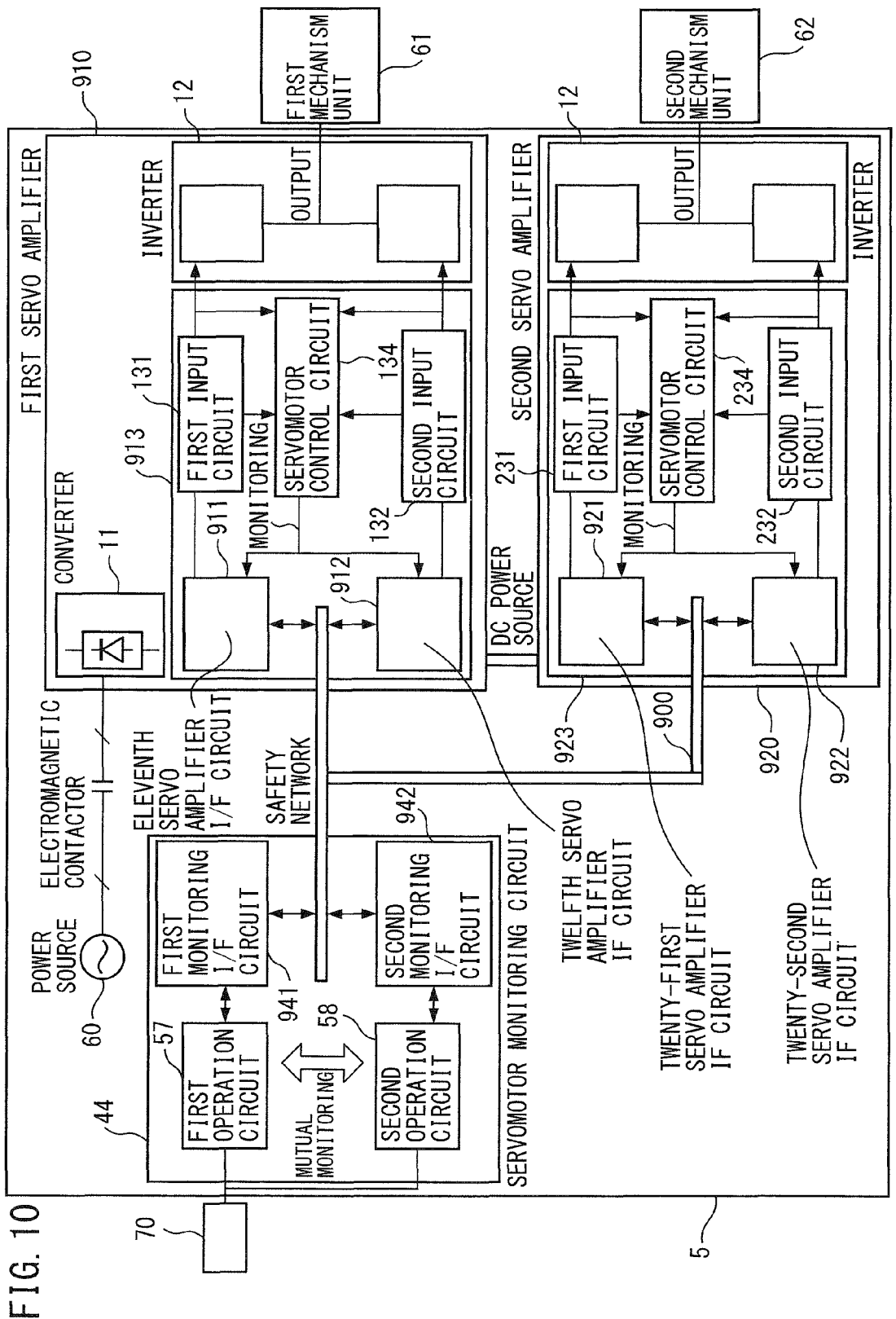
FIG. 10 is a block diagram illustrating a servomotor control device according to Fifth Embodiment.

FIG. 10 is a block diagram illustrating a servomotor control device according to Fifth Embodiment.

A servomotor control device 5 according to Fifth Embodiment is different from the servomotor control device 1 according to First Embodiment in that a first servo amplifier 910 and a second servo amplifier 920 are arranged in place of the first servo amplifier 10 and the second servo amplifier 20. In addition, the servomotor control device 5 according to Fifth Embodiment is different from the servomotor control device 1 according to First Embodiment in that a servomotor monitoring circuit 44 is arranged in place of the servomotor monitoring circuit 40.

The first servo amplifier 910 is different from the first servo amplifier 10 in having an eleventh servo amplifier interface circuit 911 and a twelfth servo amplifier interface circuit 912. Each of the eleventh servo amplifier interface circuit 911 and the twelfth servo amplifier interface circuit 912 is a semiconductor device, and transmits/receives signals such as the first safety signal and the second safety signal through a safety network 900.

The second servo amplifier 920 is different from the second servo amplifier 20 in having a twenty-first servo amplifier interface circuit 921 and a twenty-second servo amplifier interface circuit 922. Each of the twenty-first servo amplifier interface circuit 921 and the twenty-second servo amplifier interface circuit 922 is a semiconductor device, and transmits/receives signals such as the first safety signal and the second safety signal through the safety network 900.

The servomotor monitoring circuit 44 is different from the servomotor monitoring circuit 40 in having a first monitoring interface circuit 941 and a second monitoring interface circuit 942. Each of the first monitoring interface circuit 941 and the second monitoring interface circuit 942 is a semiconductor device, and transmits/receives signals such as the first safety signal and the second safety signal through the safety network 900.

The safety network 900 is a communication path capable of transmitting a safety signal that may require high reliability. The safety network 900 transmits a signal obtained in a dedicated interface circuit formed by a semiconductor device through a transmission channel having a good noise resistance and has an error detector of transmitted data, and thus, can transmit a safety signal that may require high reliability.

In the servomotor control device 5, since the first safety signal and the second safety signal are transmitted/received using the safety network 900 capable of transmitting a safety signal that may require high reliability, the servomotor monitoring circuit 44 can be arranged at a position away from the first servo amplifier 910 and the second servo amplifier 920, and a connection of the servomotor monitoring circuit 44, the first servo amplifier 910, and the second servo amplifier 920 can be simplified.

Although the electromagnetic contactor 30 is arranged to disconnect the electrical connection between the power source 60 and the converter 11 in the above-described First to Fifth Embodiments, a semiconductor circuit having a function of disconnecting the electrical connection between the power source 60 and the converter 11 may be arranged in place of the electromagnetic contactor 30. The semiconductor circuit includes switch elements such as a thyristor, a GTO (Gate Turn Off Thyristor), an IBGT (Insulated Gate Bipolar Transistor), an SI (Static Induction) thyristor, and a MOSFET (Metal-Oxide Silicon Field-Effect Transmitter). When the semiconductor circuit is arranged in place of the electromagnetic contactor 30, the first operation circuit 51 determines whether or not the semiconductor circuit is normal by detecting the output voltage of the converter and deciding whether the semiconductor circuit normally operates. When detecting that the semiconductor circuit is not normal, the first operation circuit 51 transmits a disconnection instruction signal indicating a disconnection instruction of the electrical connection between the power source 60 and the converter 11 to the semiconductor circuit and stops the transmission of the safety signal. As just described, by using a semiconductor for a power source disconnect circuit, a component lifetime associated with opening and closing of the power source can be drastically extended, and furthermore, the reliability is also improved.

In addition, in the above-described Fourth Embodiment, the brake control circuits 136 and 236 which are respectively arranged in the first servo amplifier 810 and the second servo amplifier 820 control the brakes 631 to 636 and 641 to 648. However, any of the first operation circuit 851 and the second operation circuit 852 may be made to control the brakes 631 to 636 and 641 to 648. When the second operation circuit 852 controls the brakes 631 to 636 and 641 to 648, the second operation circuit 852 determines whether or not each of the brakes 631 to 636 and 641 to 648 is normal. When the second operation circuit 852 determines that any of the brakes 631 to 636 and 641 to 648 is not normal, the second operation circuit 852 transmits the power source opening command signal to the first operation circuit 851. Next, the first operation circuit 851 and the second operation circuit 852 stop the transmission of the first safety signal and the second safety signal to both the first servo amplifier 810 and the second servo amplifier 820. In addition, the first operation circuit 851 transmits the opening signal to the operation coil 303 of the electromagnetic contactor 30, and the electromagnetic contactor 30 that has received the opening signal disconnects the electrical connection between the power source 60 and the converter 11 by the opening operation of the main contact.

In all of the block diagrams of the present invention, FIG. 1, FIG. 4, FIG. 6, FIG. 8, and FIG. 10, the alternating current power source 60 is used for the power source, but a direct current power source or a battery power source can be applied to the present invention. In this case, the alternating current power source 60 is changed to a direct current power source 601, the converter 11 becomes unnecessary, and the power source disconnect circuit is connected between the direct current power source 601 and the inverters 121 to 126 and the inverters 221 to 228.

Hereinafter, Embodiments 1 to 3 of a production system, to which the servomotor control devices according to Embodiments are applied, will be described in turn.

Embodiment 1

Figure 11:
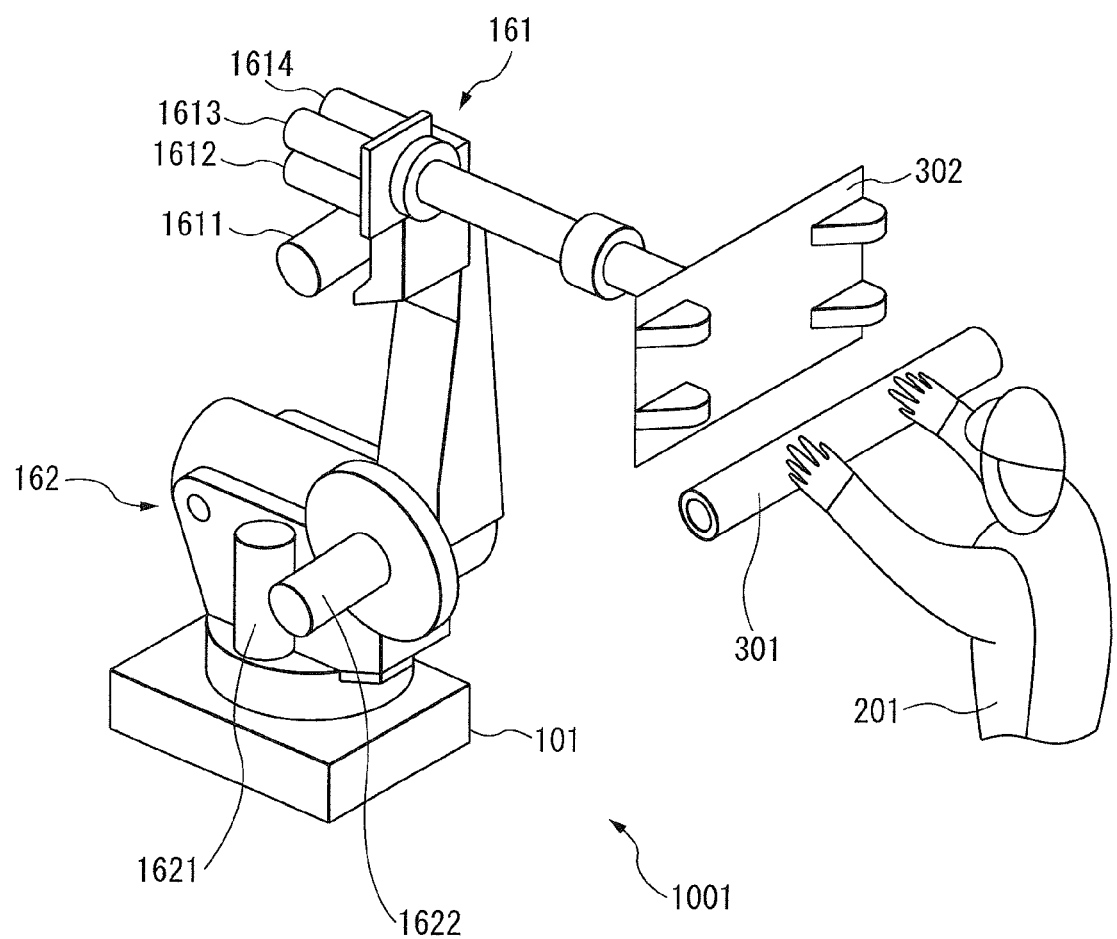
FIG. 11 is a diagram illustrating Embodiment of a production system for directly attaching/detaching a workpiece to/from a robot.

FIG. 11 is a diagram illustrating Embodiment of a production system for directly attaching/detaching a workpiece to/from a robot.

A robot 101 arranged in a production system 1001 includes a first mechanical unit 161, a second mechanical unit 162, and a workpiece fixed part 302 arranged at the end part of an arm part extending from the first mechanical unit 161. An eleventh servomotor 1611 to a fourteenth servomotor 1614 are arranged in the first mechanical unit 161, and a twenty-first servomotor 1621 to a twenty-second servomotor 1622 are arranged in the second mechanical unit 162. The workpiece fixed part 302 has a flat surface on which two pairs of protrusions are formed. A worker 201 fits a workpiece in the two pairs of protrusions formed on the flat surface of the workpiece fixed part 302.

The robot 101 is controlled by the servomotor control device 1 according to First Embodiment. The eleventh servomotor 1611 to the fourteenth servomotor 1614 arranged in the first mechanical unit 161 are connected to the first servo amplifier 10, and the twenty-first servomotor 1621 to the twenty-second servomotor 1622 arranged in the second mechanical unit 162 are connected to the second servo amplifier 20.

The worker 201 enters the first common area that is the area in which movable ranges of the first mechanical unit 161 and the second mechanical unit 162, and a working range of the worker 201 are overlapped, so as to fit the workpiece 301 in the two pairs of protrusions formed on the flat surface of the workpiece fixed part 302. When the worker 201 enters the first common area, the servomotor monitoring circuit 40 transmits the first safety signal and the second safety signal to the first servo amplifier 10 and the second servo amplifier 20, and the first servo amplifier 10 and the second servo amplifier 20 stop the transmission of the pulse width modulation signal. When the first servo amplifier 10 and the second servo amplifier 20 stop the transmission of the pulse width modulation signal, the eleventh servomotor 1611 to the fourteenth servomotor 1614 and the twenty-first servomotor 1621 to the twenty-second servomotor 1622 are stopped.

When attaching/detaching the workpiece 301 to/from the robot 101, the servomotors are stopped by stopping the transmission of the pulse width modulation signal, and an opening/closing operation of the electromagnetic contactor 30 is unnecessary, and therefore, there are advantages of shortening attaching/detaching time, without the occurrence of a decrease in a lifetime of devices such as the electromagnetic contactor 30, and the like.

Embodiment 2

Figure 12B:
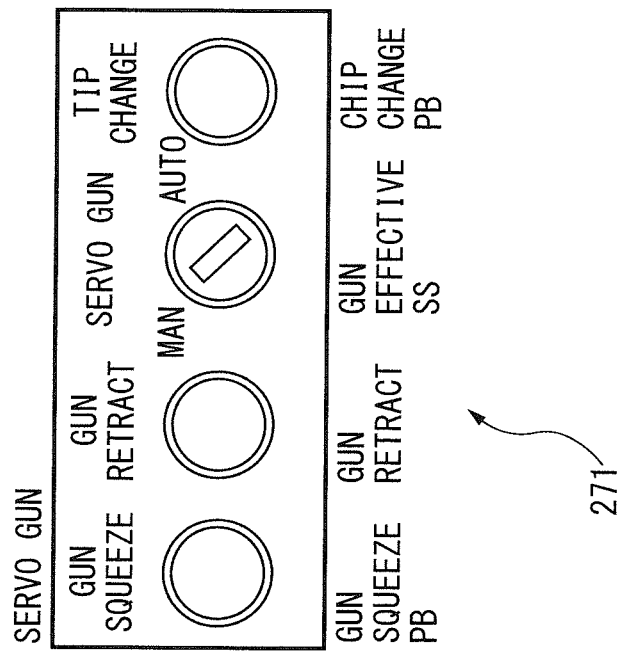
FIG. 12B is an enlarged diagram of an operation box illustrated in FIG. 12A.
Figure 12A:
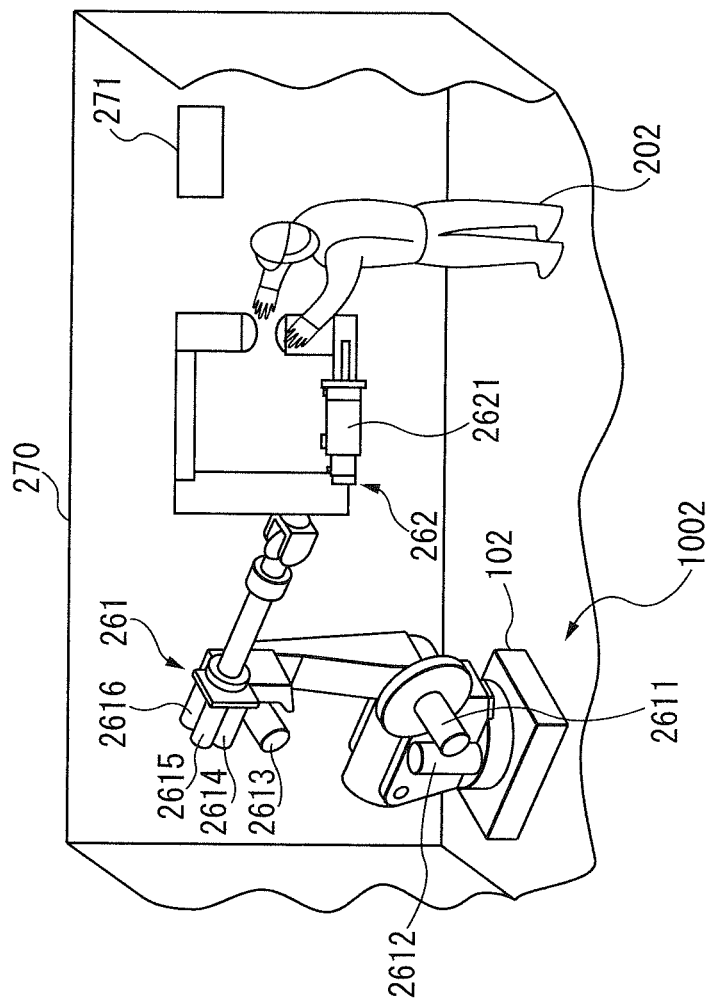
FIG. 12A is a diagram illustrating Embodiment chip changing and chip positioning of a servo gun system including a servomotor mounted on the end of a robot hand.

FIG. 12A is a diagram illustrating Embodiment chip changing and chip positioning of a servo gun system including a servomotor mounted on the end of a robot hand, and FIG. 12B is an enlarged diagram of an operation box for operating the servo gun illustrated in FIG. 12A.

A robot 102 arranged in a production system 1002 is arranged inside a fence 270, and includes a first mechanical unit 261 and a second mechanical unit 262 arranged at the end part of an arm part extending from the first mechanical unit 261. An eleventh servomotor 2611 to a sixteenth servomotor 2616 are arranged in the first mechanical unit 261, and a twenty-first servomotor 2621 for driving a servo gun shaft is arranged in the second mechanical unit 262. A worker 202 changes a chip of a servo gun arranged in the second mechanical unit 262 and carries out positioning of the changed chip.

The robot 102 is controlled by the servomotor control device 2 according to Second Embodiment. The eleventh servomotor 2611 to the sixteenth servomotor 2616 arranged in the first mechanical unit 261 are connected to the first servo amplifier 10, and the twenty-first servomotor 2621 arranged in the second mechanical unit 262 is connected to the second servo amplifier 20.

The worker 202 enters the inside of the fence 270 corresponding to the second common area so as to change the chip of the servo gun and carry out positioning of the changed chip. When the worker 202 enters the inside of the fence 270, the servomotor monitoring circuit 41 stops the transmission of the first safety signal and the second safety signal to the first servo amplifier 10, and the first servo amplifier 10 stops the transmission of the pulse width modulation signal. When the first servo amplifier 10 stops the transmission of the pulse width modulation signal, the eleventh servomotor 2611 to the sixteenth servomotor 2616 are stopped.

On the other hand, when the worker 202 enters the inside of the fence 270, the servomotor monitoring circuit 41 stops once the transmission of the first safety signal and the second safety signal to the second servo amplifier 20, and when the worker 202 operates an operation box 271 arranged inside the fence 270, the servomotor monitoring circuit 41 performs the transmission of the first safety signal and the second safety signal to the second servo amplifier 20 so that the second mechanical unit 262 becomes an operable state.

The worker 202 stops the activation of the twenty-first servomotor 2621 by operating the operation box 271, changes the chip of the servo gun, and carries out positioning of the changed chip. Since the worker 202 can work by operating the operation box 271, an operation of a teaching operation panel or the like is unnecessary.

The operation box 271 is arranged inside the fence 270 at a position away from the second mechanical unit 262 by a certain distance and is arranged in an area where the position of the chip can be viewed so that chip changing and chip-position confirming operations can be safely carried out.

Embodiment 3

Figure 13B:
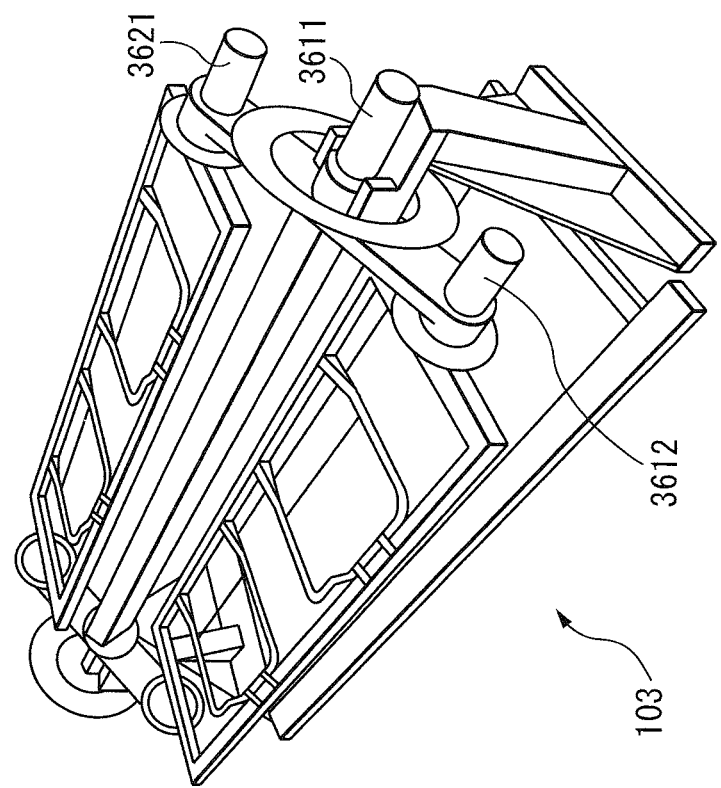
FIG. 13B is a perspective diagram of the positioner arranged in the system illustrated in FIG. 13A.
Figure 13A:
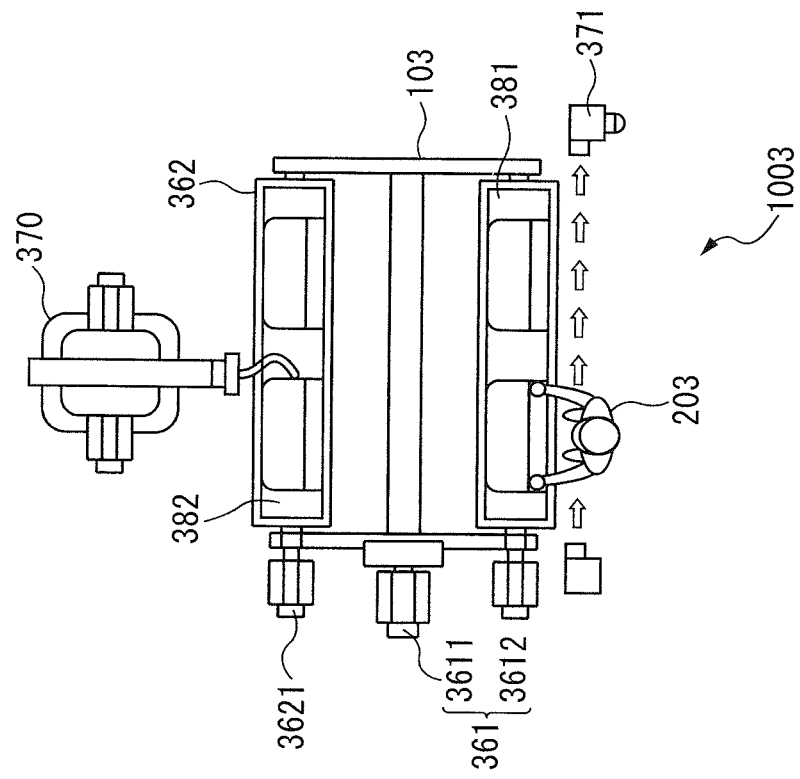
FIG. 13A is a diagram illustrating Embodiment in a production system in which a worker attaches/detaches a workpiece to/from a positioner.

FIG. 13A is a diagram illustrating Embodiment in a production system in which a worker attaches/detaches a workpiece to/from a positioner, and FIG. 13B is a perspective diagram of the positioner arranged in the system illustrated in FIG. 13A.

A positioner 103 arranged in a production system 1003 includes an eleventh servomotor 3611, a twelfth servomotor 3612, and a twenty-first servomotor 3621. The eleventh servomotor 3611 rotatably drives a main body part having a first positioner 381 and a second positioner 382 arranged at both ends in both directions, a right-hand turn and a left-hand turn. The twelfth servomotor 3612 rotatably drives the first positioner 381 in both directions, a right-hand turn and a left-hand turn. The twenty-first servomotor 3621 rotatably drives the second positioner 382 in both directions, a right-hand turn and a left-hand turn. The eleventh servomotor 3611 and the twelfth servomotor 3612 are arranged in a first mechanical unit 361, and the twenty-first servomotor 3621 is arranged in a second mechanical unit 362. A worker 203 disconnects a light curtain 371 when attaching/detaching a workpiece to/from the first positioner 381.

The positioner 103 is controlled by the servomotor control device 3 according to Third Embodiment. The eleventh servomotor 3611 to the twelfth servomotor 3612 arranged in the first mechanical unit 361 are connected to the first servo amplifier 10, and the twenty-first servomotor 3621 arranged in the second mechanical unit 362 is connected to the second servo amplifier 20.

When the worker 203 attaches/detaches the workpiece to/from the first positioner 381, by disconnecting the light curtain 371, the servomotor monitoring circuit 42 determines that the worker 203 enters the second common area. When the worker 203 enters the inside of the fence 270, the servomotor monitoring circuit 42 receives a position signal indicating positional information of the twelfth servomotor 3612, detected by the motor position detection sensor 72, from the motor position detection sensor 72. The servomotor monitoring circuit 42 calculates the positional information of the twelfth servomotor 3612 and determines that the twelfth servomotor 3612 is located in the second common area. When the twelfth servomotor 3612 is determined to be located in the second common area, the transmission of the first safety signal and the second safety signal to the first servo amplifier 10 is stopped, and the first servo amplifier 10 stops the transmission of the pulse width modulation signal. When the first servo amplifier 10 stops the transmission of the pulse width modulation signal, the eleventh servomotor 3611 to the twelfth servomotor 3612 are stopped. On the other hand, since the first safety signal and the second safety signal are transmitted to the second servo amplifier 20, the twenty-first servomotor 3621 connected to the second servo amplifier 20 is in an operable state. While the worker 203 attaches/detaches the workpiece to/from the first positioner 381, the twenty-first servomotor 3621 drives the second positioner 382 and continues the work together with a robot 370.

In this Embodiment, while the eleventh servomotor 3611 and the twelfth servomotor 3612 are stopped, the twenty-first servomotor 3621 and the robot 370 can continue the operation. Therefore, while the worker 203 attaches/detaches the workpiece, production by the robot 370 and the twenty-first servomotor 3621 can be continued.

In the production system 1003, when the light curtain 371 detects that the worker 203 leaves the common area after attaching/detaching of the workpiece to drive the eleventh servomotor 3611, the position of the first positioner 381 and the position of the second positioner 382 are changed, and the change of the positions of a workpiece to be processed and a workpiece to be attached/detached is performed. When the position of the first positioner 381 and the position of the second positioner 382 are changed, whether any of the first positioner 381 and the second positioner 382 is located in the second common area is determined from the position signal detected by the motor position detection sensor 72. When the first positioner 381 is determined to be located in the second common area, the transmission of the pulse width modulation signal to the inverter that drives the twelfth servomotor 3612 is stopped, and the transmission of the pulse width modulation signal to the inverter that drives the twenty-first servomotor 3621 is continued. When the second positioner 382 is determined to be located in the second common area, the transmission of the pulse width modulation signal to the inverter that drives the twenty-first servomotor 3621 is stopped, and the transmission of the pulse width modulation signal to the inverter that drives the twelfth servomotor 3612 is continued.

According to a first aspect, when determining to stop the servomotor, the servomotor control device stops the servomotor without disconnecting the connection between the power source for supplying an alternating current to the converter, and the converter, by stopping the transmission of the safety signal to the servomotor control circuit to stop the supply of the pulse width modulation signal to the inverter, and therefore, the activation of the servomotor can be quickly stopped. In addition, when determining whether or not the power source disconnect circuit and the servomotor control circuit are normal and determining that at least one of the power source disconnect circuit and the servomotor control circuit is not normal, the servomotor control device stops the servomotor by disconnecting the connection between the power source and the converter with the power source disconnect circuit and stopping the transmission of the safety signal to the servomotor control circuit, and therefore, the servomotor can be safely stopped when at least one of the power source disconnect circuit and the servomotor control circuit is not normal.

In addition, in the above-described first aspect, when the servomotor control circuit determines that the safety signal transmitted by the first operation circuit and the safety signal transmitted by the second operation circuit are not identical, the servomotor monitoring circuit may stop the servomotor by disconnecting the connection between the power source and the converter with the power source disconnect circuit and stopping the transmission of the safety signal to the servomotor control circuit, and even when the first operation circuit or the second operation circuit malfunctions, the servomotor can be safely stopped and the malfunction can be detected, and therefore, the reliability of the servomotor control device can be further improved.

In addition, in the above-described first aspect, in the servomotor control device, the servomotor control circuit and the servomotor monitoring circuit may be connected through the communication path capable of transmitting the safety signal, and therefore, even when the servomotor monitoring circuit is arranged at a position away from the servomotor control circuit, the safety signal can be transmitted by the communication path capable of transmitting the safety signal.

In addition, when the servomotor monitoring circuit and the servomotor control circuit are connected by the communication path capable of transmitting the safety signal, in a system including a plurality of servomotor control circuits, wires between the servomotor monitoring circuit and the respective servomotor control circuits can be reduced.

According to a second aspect, when determining that the entry detection sensor detects that the worker enters the common area, the production system stops the transmission of the first safety signal to the first servomotor control circuit whose movable range overlaps with the working range where the worker works to stop the supply of the pulse width modulation signal to the first inverter and stop the first servomotor, but continues the transmission of the first safety signal to the second servomotor control circuit whose movable range does not overlap with the working range where the worker works to continue the driving of the second servomotor, and therefore, a decrease in the working efficiency of the production system can be minimized.

According to a third aspect, when determining that the entry detection sensor detects that the worker enters the common area, the production system calculates the position of the mechanical unit from the position of the servomotor detected by the motor position detection sensor, determines whether or not the worker who has entered the common area interferes with the mechanical unit when the mechanical unit is located at the calculated position, and stops the transmission of the safety signal to the servomotor control circuit when determining that the mechanical unit interferes with the worker who has entered the common area to stop the mechanical unit, but continues the driving of the mechanical unit which does not cause the interference by continuing the transmission of the safety signal, and therefore, a decrease in the working efficiency of the production system can be minimized.

In addition, in the above-described third aspect, whether or not the position of the mechanical unit calculated by the first operation circuit and the position of the mechanical unit calculated by the second operation circuit are identical is further determined, and when determining that the position of the mechanical unit calculated by the first operation circuit and the position of the mechanical unit calculated by the second operation circuit are not identical, a power source disconnect signal may be transmitted to the power source disconnect circuit and the transmission of the safety signal to the servomotor control circuit may be stopped, and therefore, the safety of the worker can be further improved.

What is claimed is:

1. A servomotor control device comprising:
   an inverter for driving a servomotor by converting a direct current into an alternating current and supplying a converted alternating current to the servomotor;
   a power source disconnect circuit for disconnecting supply of the direct current to the inverter;
   a servomotor control circuit for controlling the inverter such that the alternating current is supplied to the servomotor when receiving a safety signal, and for controlling the inverter such that the alternating current is not supplied to the servomotor when not receiving the safety signal; and
   a servomotor monitoring circuit for stopping the servomotor by stopping transmission of the safety signal to the servomotor control circuit when determining to stop the servomotor so as to secure the safety of a worker in a common area that is an area in which a movable range of a mechanical unit that mounts the servomotor and a working range wherein the worker works overlap, and for stopping the servomotor by disconnecting the supply of the direct current to the inverter with the power source disconnect circuit and stopping the transmission of the safety signal to the servomotor control circuit when determining that at least one of the power source disconnect circuit and the servomotor control circuit is not normal.

2. The servomotor control device according to claim 1, wherein
   the servomotor monitoring circuit includes a first operation circuit and a second operation circuit that is a separate circuit from the first operation circuit, and
   the servomotor is stopped by disconnecting the supply of the direct current to the inverter with the power source disconnect circuit and stopping the transmission of the safety signal to the servomotor control circuit when the servomotor control circuit determines that the safety signal transmitted by the first operation circuit and the safety signal transmitted by the second operation circuit are not identical.

3. The servomotor control device according to claim 1, wherein the servomotor control circuit and the servomotor monitoring circuit are connected through a communication path capable of transmitting the safety signal.

4. The servomotor control device according to claim 1, further comprising:
   a converter for converting an alternating current into a direct current and supplying a converted direct current to the inverter, wherein
   the power source disconnect circuit is an electromagnetic contactor for disconnecting a connection between a power source for supplying the alternating current to the converter, and the converter, and is an electromagnetic contactor including an auxiliary contact that mechanically works together with a main contact, and
   the servomotor monitoring circuit determines whether or not the power source disconnect circuit is normal by detecting a state of the auxiliary contact.

5. The servomotor control device according to claim 1, wherein
   the power source disconnect circuit is a semiconductor circuit for disconnecting the supply of the direct current to the inverter, and
   the servomotor monitoring circuit detects the direct current that is input to the inverter, and determines whether or not the semiconductor circuit is normal based on the detection result.

6. The servomotor control device according to claim 1, further comprising:
   a brake control circuit for controlling a brake for stopping the servomotor, which is a regenerative brake or an electromagnetic brake, wherein
   the servomotor monitoring circuit stops the servomotor by disconnecting the supply of the direct current to the inverter and stopping the transmission of the safety signal to the servomotor control circuit when the brake control circuit determines that the brake is not normal.

7. A production system comprising:
   an entry detection sensor for detecting that a worker enters a common area that is an area in which a movable range of a first mechanical unit that mounts a first servomotor and a working range where the worker works are overlapped;

a first inverter for driving the first servomotor by converting a direct current into an alternating current and supplying a converted alternating current to the first servomotor;

a second inverter for driving a second servomotor by converting the direct current into an alternating current and supplying the converted alternating current to the second servomotor mounted on a second mechanical unit whose movable range does not overlap with the common area;

a power source disconnect circuit for disconnecting supply of the direct current to the inverter;

a first servomotor control circuit for controlling the first inverter such that the alternating current is supplied to the first servomotor when receiving a safety signal, and for controlling the first inverter such that the alternating current is not supplied to the first servomotor when not receiving the safety signal;

a second servomotor control circuit for controlling the second inverter such that the alternating current is supplied to the second servomotor when receiving a safety signal, and for controlling the second inverter such that the alternating current is not supplied to the second servomotor when not receiving the safety signal; and a servomotor monitoring circuit for stopping the first servomotor by stopping transmission of the safety signal to the first servomotor control circuit when the entry detection sensor detects that the worker enters the common area, and for stopping the first servomotor and the second servomotor by disconnecting the supply of the direct current to the inverter with the power source disconnect circuit and stopping transmission of the safety signal to the first servomotor control circuit and the second servomotor control circuit when determining that at least one of the power source disconnect circuit, the safety signal, the first servomotor control circuit, and the second servomotor control circuit is not normal.

8. A production system comprising:

an entry detection sensor for detecting that a worker enters a common area that is an area in which a movable range of a mechanical unit that mounts a servomotor and a working range where the worker works are overlapped;

a motor position detection sensor for detecting a position of the servomotor;

an inverter for driving the servomotor by converting a direct current into an alternating current and supplying a converted alternating current to the servomotor;

a power source disconnect circuit for disconnecting supply of the direct current to the inverter;

a servomotor control circuit for controlling the inverter such that the alternating current is supplied to the servomotor when receiving a safety signal, and for controlling the inverter such that the alternating current is not supplied to the servomotor when not receiving the safety signal; and a servomotor monitoring circuit for stopping the servomotor by stopping transmission of the safety signal to the servomotor control circuit when the entry detection sensor detects that the worker enters the common area and when determining that the mechanical unit interferes with the worker who has entered the common area, from a position of the servomotor detected by the motor position detection sensor, and for stopping the servomotor by disconnecting the supply of the direct current to the inverter with the power source disconnect circuit and stopping transmission of the safety signal to the servomotor control circuit when determining that at least one of the power source disconnect circuit, the safety signal, and the servomotor control circuit is not normal.

9. The production system according to claim 8, further comprising:

a converter for converting an alternating current into a direct current and supplying the converted direct current to the inverter, wherein the servomotor monitoring circuit includes a first operation circuit for calculating a position of the mechanical unit, from the position of the servomotor detected by the motor position detection sensor, and a second operation circuit for calculating the position of the mechanical unit, from the position of the servomotor detected by the motor position detection sensor, which is a separate circuit from the first operation circuit, and the servomotor monitoring circuit stops the servomotor by disconnecting a connection between a power source, which supplies an alternating current to the converter, and a converter with the power source disconnect circuit and stopping the transmission of the safety signal to the servomotor control circuit when determining that the position of the mechanical unit calculated by the first operation circuit and the position of the mechanical unit calculated by the second operation circuit are not identical.

* * * * *